(12) United States Patent
Murayama et al.

(10) Patent No.: US 7,087,905 B2
(45) Date of Patent: Aug. 8, 2006

(54) RADIATION THREE-DIMENSIONAL POSITION DETECTOR

(75) Inventors: Hideo Murayama, Chiba (JP); Naoko Inadama, Chiba (JP); Keishi Kitamura, Kyoto (JP); Takaji Yamashita, Hamamatsu (JP)

(73) Assignees: National Institute of Radiological Sciences, Chiba (JP); Shimadzu Corporation, Kyoto (JP); Hamamatsu Photonics K.K., Shizouka (JP)

( * ) Notice: Subject to any disclaimer, the term of this patent is extended or adjusted under 35 U.S.C. 154(b) by 191 days.

(21) Appl. No.: 10/786,366

(22) Filed: Feb. 26, 2004

(65) Prior Publication Data

US 2004/0178347 A1   Sep. 16, 2004

(30) Foreign Application Priority Data

Mar. 12, 2003   (JP) ............................ P2003-067094

(51) Int. Cl.
*G01T 1/20* (2006.01)
(52) U.S. Cl. .................. 250/367; 250/363.03; 250/368
(58) Field of Classification Search ............... 250/367, 250/363.03, 368
See application file for complete search history.

(56) References Cited

U.S. PATENT DOCUMENTS

| 4,945,241 A | 7/1990 | Yamashita et al. .......... 250/367 |
| 6,087,663 A | 7/2000 | Moisan et al. .............. 250/367 |
| 2005/0087693 A1* | 4/2005 | Sumiya et al. .............. 250/367 |

FOREIGN PATENT DOCUMENTS

| JP | 63-047686 | 2/1988 |
| JP | 01-229995 | 9/1989 |
| JP | 06-337289 | 12/1994 |

(Continued)

OTHER PUBLICATIONS

Inadama et al., "A Depth of Interaction Detector for PET With GSO Crystals Doped With Differenct Amounts of Ce", *IEEE Transactions on Nuclear Science*, vol. 49, No. 3, pp. 629-633, Jun. 2002.

(Continued)

*Primary Examiner*—Renee Luebke
*Assistant Examiner*—Mary Zettl
(74) *Attorney, Agent, or Firm*—Drinker Biddle & Reath LLP

(57) ABSTRACT

The radiation three-dimensional position detector of the present invention comprises a scintillator unit (10), a light receiving element (20) and an operation section (30). The scintillator unit is disposed on the light incident plane of the light receiving element, wherein the scintillator unit is comprised of four layers of scintillator arrays, each layer being composed of scintillator cells arrayed in 8 row -8 column matrix. The scintillator cell produces scintillation light corresponding to the radiation absorbed thereby. The optical characteristic of a partition material for separating neighboring scintillator cells, which faces at least one same side face is different between a scintillator cell $C_{k1,m,n}$ included in one scintillator array layer (k1-th layer) and a scintillator cell $C_{k2,m,n}$ included in the other scintillator array layer (k2-th layer).

16 Claims, 21 Drawing Sheets

FOREIGN PATENT DOCUMENTS

| | | |
|---|---|---|
| JP | 11-142523 | 5/1999 |
| JP | 11-142524 | 5/1999 |
| JP | 2000-056023 | 2/2000 |
| JP | 2000-180551 | 6/2000 |
| JP | 2003-021682 | 1/2003 |

OTHER PUBLICATIONS

Yamamoto et al., "A GSO Depth of Interaction Detector for PET", *IEEE Transactions on Nuclear Science*, vol. 45, No. 3, pp. 1078-1082, Jun. 1998.

Moisan et al., "Segmented LSO Crystals for Depth-of-Interaction Encoding in PET", *IEEE Transactions on Nuclear Science*, vol. 45, No. 6, pp. 3030-3035, Dec. 1998.

Miyaoka et al., "Design of a Depth of Interaction (DOI) PET Detector Module", *IEEE Transactions on Nuclear Science*, vol. 45, No. 3, pp. 1069-1073, Jun. 1998.

* cited by examiner

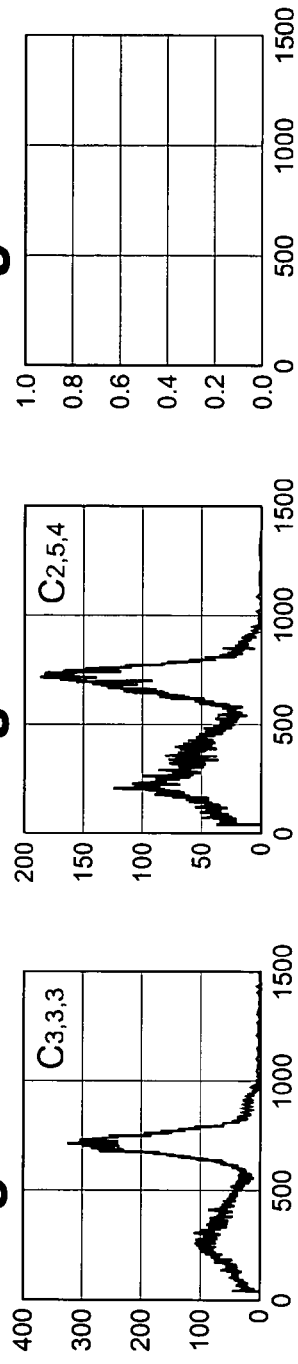
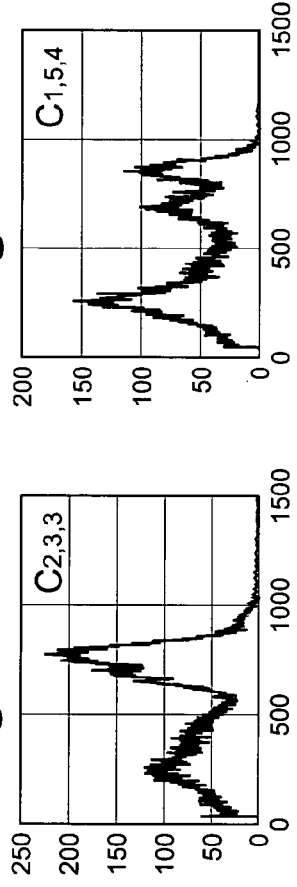
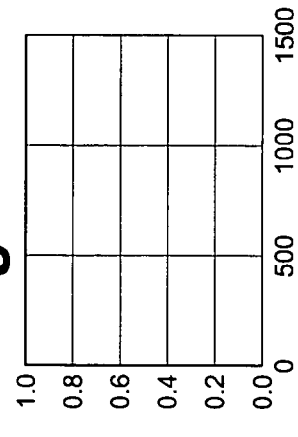
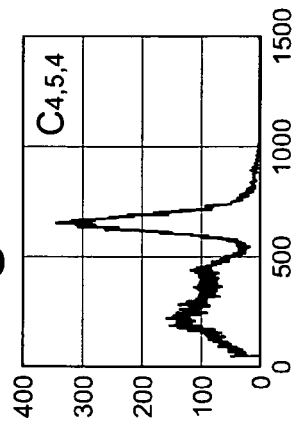
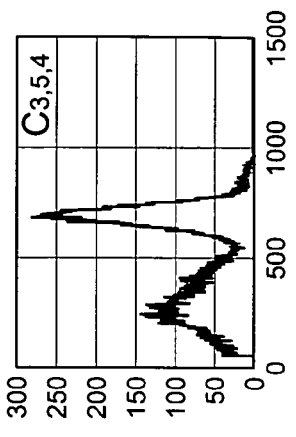
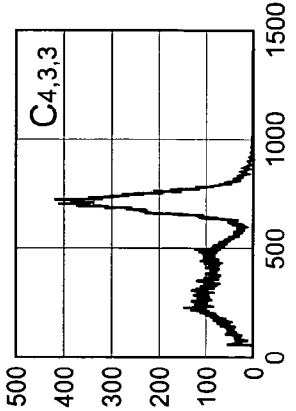

RADIATION THREE-DIMENSIONAL POSITION DETECTOR

BACKGROUND OF THE INVENTION

1. Field of the Invention

This invention relates to a radiation three-dimensional position detector including a scintillator unit and a light receiving element.

2. Related Background Art

The radiation three-dimensional position detector is used, for example, in a PET (positron emission tomography) apparatus as a radiation detector which detects pair of γ-ray photons (energy: 511 k eV), which is produced following on the pair annihilation of electron and positron within a subject to which a positron emission isotope (RI radiation source) is applied, and fly in the opposite directions with respect to each other. The PET apparatus detects pair of γ-ray photons with a radioactive transducer in a manner of simultaneous counting, and the simultaneously counted information is accumulated to create a histogram. Further, the PET apparatus, reconstructs, based on the created histogram, an image representing spatial distribution of the generative frequency of the pair of γ-ray photons in a measurement space. The PET apparatus performs an important role in the field of nuclear medicine. By using the PET apparatus, for example, function of living organism and high-level function of brain can be examined.

The radiation three-dimensional position detector, which is suitably used as a radioactive transducer for such PET apparatus, includes a scintillator unit and a light receiving element (for example, refer to Patent document 1 and Non-patent document 1). From among the above mentioned scintillator unit and light receiving element, the light receiving element outputs electric signal corresponding to the incident position and intensity of the light incident on the light incident plane. The scintillator unit is disposed on the light incident plane of the light receiving element and includes K layers of scintillator arrays in which scintillator cells for producing scintillation light corresponding to the absorption of the radiation are disposed in two dimensions (K is an integer number of 2 or greater), these K-layers of scintillator arrays are laminated in the direction perpendicular to the light incident plane of the light receiving element.

Particularly, in a radiation three-dimensional position detector disclosed in Patent document 1, the K layers of scintillator arrays are laminated being displaced by 1/K of the disposition pitch of the scintillator cells in the row or column direction. Also, in a radiation three-dimensional position detector disclosed in Non-patent document 1, there are employed scintillator cells having a different fluorescent attenuation constant respectively for the first and third layer scintillator arrays and the second and fourth layer scintillator arrays.

The above-described radiation three-dimensional position detector can detect the position of the radiation absorption in the scintillator unit not only as a location on a two dimensional planes parallel to the light incident plane of the light receiving element but also as a distance from the light incident plane. That is, in the scintillator unit in which a plurality of scintillator cells is disposed in three dimensions, it is possible to determine which scintillator cell has produced the scintillation light based on the position of the barycenter of the scintillation light which has reached the light incident plane of the light receiving element.

[Patent document 1]

Japanese Unexamined Patent Application Publication (Tokukai) No. H-1-229995

[Non-patent document 1]

N. Inadama, et al., "A Depth of Interaction Detector for PET with GSO Crystals Doped with Different Amounts of Ce", IEEE Transaction of Nuclear Science, Vol.49, No.3, pp.629–633 (2002)

SUMMARY OF THE INVENTION

However, in the radiation three-dimensional position detector disclosed in the above Patent document 1, the farther the location of a scintillator cell, which produces scintillation light corresponding to the absorption of radiation is from the light incident plane of the light receiving element, the wider the range of the intensity distribution of the scintillation light, which reaches the light incident plane of the light receiving element becomes. If the intensity distribution of the scintillation light has a wide range in the light incident plane of the light receiving element, it is difficult to determine the corresponding scintillator cell based on the position of the barycenter. Accordingly, there is a limit to any increase in the number of scintillator arrays to be laminated in built-up layers, and also, there is a limit in regard to detection accuracy of the position of the absorbed radiation.

On the other hand, in the radiation three-dimensional position detector disclosed in the above-mentioned Non-patent document 1, in terms of the scintillation light produced in the respective scintillator cells appearing positioned in the same location of the respective scintillator arrays on being viewed in the lamination direction, the position of the barycenter becomes extremely close to each other in the light incident plane of the light receiving element. Accordingly, in this case also, there is a limit to any increase in the number of laminated scintillator arrays, and also, there is a limit in regard to detection accuracy of the position of the radiation absorption.

The present invention has been made in view of the above described problems, and an object thereof is to provide a radiation three-dimensional position detector which is capable of increasing the number of layers of the scintillator arrays and excellent in detection accuracy of the position where the radiation is absorbed.

A radiation three-dimensional position detector in accordance with the present invention comprises (1) a light receiving element which outputs an electric signal corresponding to the incident position and intensity of light incident on a light incident plane, and (2) a scintillator unit, which is disposed on the light incident plane of the light receiving element, such that the scintillator unit includes K layers of scintillator arrays (K is an integer number 2 or greater) comprised of M rows and N columns of scintillator cells (M and N are an integer number of 2 or greater, respectively) being arrayed in two dimensions, so as to produce scintillation light corresponding to the absorption of radiation, these K layers of scintillator arrays are laminated as built-up layers on the light incident plane of the light receiving element. And it is characterized in that, provided there is designated as $C_{k,m,n}$ (here, $1 \leq k \leq K$, $1 \leq m \leq M$, $1 \leq n \leq N$) a scintillator cell, located at a location defined by a m-th row and a n-th column, within the k-th layer of scintillator arrays from among the K layers of scintillator arrays, there is made optical conditions different from each other, at least one same side face, between a scintillator cell $C_{k1,m,n}$ included in a scintillator array of the k1-th layer and a scintillator cell $C_{k2,m,n}$ included in the k2-th scintillator array within the K-layers scintillator arrays(here, 1<m<M, 1<n<N).

In the radiation three-dimensional position detector constituted as described above, when radiation (for example, γ-ray) is made incident on the scintillator unit and when the radiation is absorbed by either of the scintillator cells in the scintillator unit, in the scintillator cell which has absorbed the radiation, scintillation light with a intensity corresponding to the absorbed radiation energy is produced. The scintillation light travels in every direction from the generation point thereof, but being reflected and thus guided by a reflective material, finally is made incident on the light incident plane of the light receiving element. The position of the center of gravity pertaining to the incidence of the scintillation light on the light incident plane of the light receiving element corresponds to the generation point of the scintillation light (i.e., position of the absorbed radiation).

Now, since there is a difference in the optical conditions (for example, reflectance, transmittance, roughness or the like) on at least one same side surface between a scintillator cell $C_{k1,m,n}$ included in a scintillator array of a k1-th lay and a scintillator cell $C_{k2,m,n}$ included in a scintillator array of a k2-th lay, there is narrow the range of the intensity distribution of the scintillation light, which has reached the light incident plane in the photo acceptance unit, even when the location of the scintillator cell, which produces the scintillation light corresponding to the absorption of the radiation is far from the light incident plane in the light receiving element. Also, there are satisfactorily separated from each other the position of the barycenter or the center of gravity pertaining to the incidence of the scintillation light incident on the light incident plane of the light receiving element, wherein the scintillation light is produced at respective scintillator cells appearing positioned in the same location of the respective scintillator arrays, on being viewed in the lamination direction of the layers. Accordingly, it is possible to increase the number of the laminated scintillator arrays, and thus, resulting in a superior detection accuracy of the position of the absorbed radiation.

The radiation three-dimensional position detector in accordance with the present invention is preferably cuboidal in shape. In this case, as such efficiency is achieved in the event of the arrangement of a plenty of scintillator arrays in three dimensions in a scintillator unit.

It is preferred that in each of the K layers scintillator arrays, in the radiation three-dimensional position detector in accordance with the present invention, a medium between two neighboring scintillators is made up of either of a reflective material or a translucent material with respect to the scintillation light, wherein preferably an area covered with the reflective material in the k1-the layer scintillator array and an area covered with the reflective material in the k2-th layer scintillator array appear different from each other on being viewed in the lamination direction of the layers. Further, it is preferred that, in the radiation three-dimensional position detector in accordance with the present invention, (1) in a scintillator array of the k1-th layer, a medium between a scintillator cell $C_{k1,p,n}$ and a scintillator cell $C_{k1,p+1,n}$, and a medium between a scintillator cell $C_{k1,m,q}$ and a scintillator cell $C_{k1,m,q+1}$ are made up of a reflective material respectively with respect to the scintillation light, whereas a medium between other scintillator cells is made up of a translucent material with respect to the scintillation light, (2) in a scintillator array of the k2-th layer, a medium between a scintillator cell $C_{k2,r,n}$ and a scintillator cell $C_{k2,r+1,n}$, and a medium between a scintillator cell $C_{k2,m,s}$ and a scintillator cell $C_{k2,m,s+1}$ are made up of a reflective material respectively with respect to the scintillation light, whereas a medium between other scintillator cells is made up of a translucent material with respect to the scintillation light, and (3) "r" and "s" are an integer number respectively in a arithmetic progression with a tolerance of 2; $1 \leq p < M$, $1 \leq q < N$, $1 \leq r < M$, $1 \leq s < N$, "p≠r" or "q≠s". In these cases, the position of barycenter of the scintillation light incidence on the light incident plane in the light receiving element corresponds to the scintillation light generation point (i.e., position of the absorbed radiation), furthermore, the range of the intensity distribution of the scintillation light in the light incident plane of the light receiving element is satisfactorily narrow, thus, the position of the barycenter of each light incidence is satisfactorily recognizable.

It is preferred that the radiation three-dimensional position detector in accordance with the present invention further comprises an operation section that calculates the position of the absorbed radiation in the scintillator unit based on the electric signal, the electric signal being outputted from the light receiving element with the scintillation light made incident on the incident plane. It is preferred that, in the radiation three-dimensional position detector in accordance with the present invention, the light receiving element has a plurality of output terminals for outputting the electric signal, and the operation section processes electric signals outputted from each of the plurality of output terminals of the light receiving element to obtain an incident position of the scintillation light in the light receiving element, and calculates the position of the absorbed radiation in the scintillator unit based on the incident position of the scintillation light. It is preferred that, in the radiation three-dimensional position detector in accordance with the present invention, the light receiving element has a plurality of output terminals for outputting the electric signal, and the operation section calculates the absorbed radiation energy in the scintillator unit based on a sum of values of electric signals outputted from each of the plurality of output terminals of the light receiving element. It is preferred that, in the radiation three-dimensional position detector in accordance with the present invention, the operation section calculates the absorbed radiation energy of each scintillator cell.

BRIEF DESCRIPTION OF THE DRAWINGS

FIGS. 11A–11I are diagrams respectively showing the crest distribution of light incident on the light incident plane in the light receiving element of the radiation three-dimensional position detector in the example.

FIG. 21 is a diagram for illustrating the position of the barycenter of the incident of scintillation light on the light incident plane of the light receiving element 20 in the radiation three-dimensional position detector 1 in accordance with the second embodiment.

DESCRIPTION OF THE PREFERRED EMBODIMENTS

Figure 1:
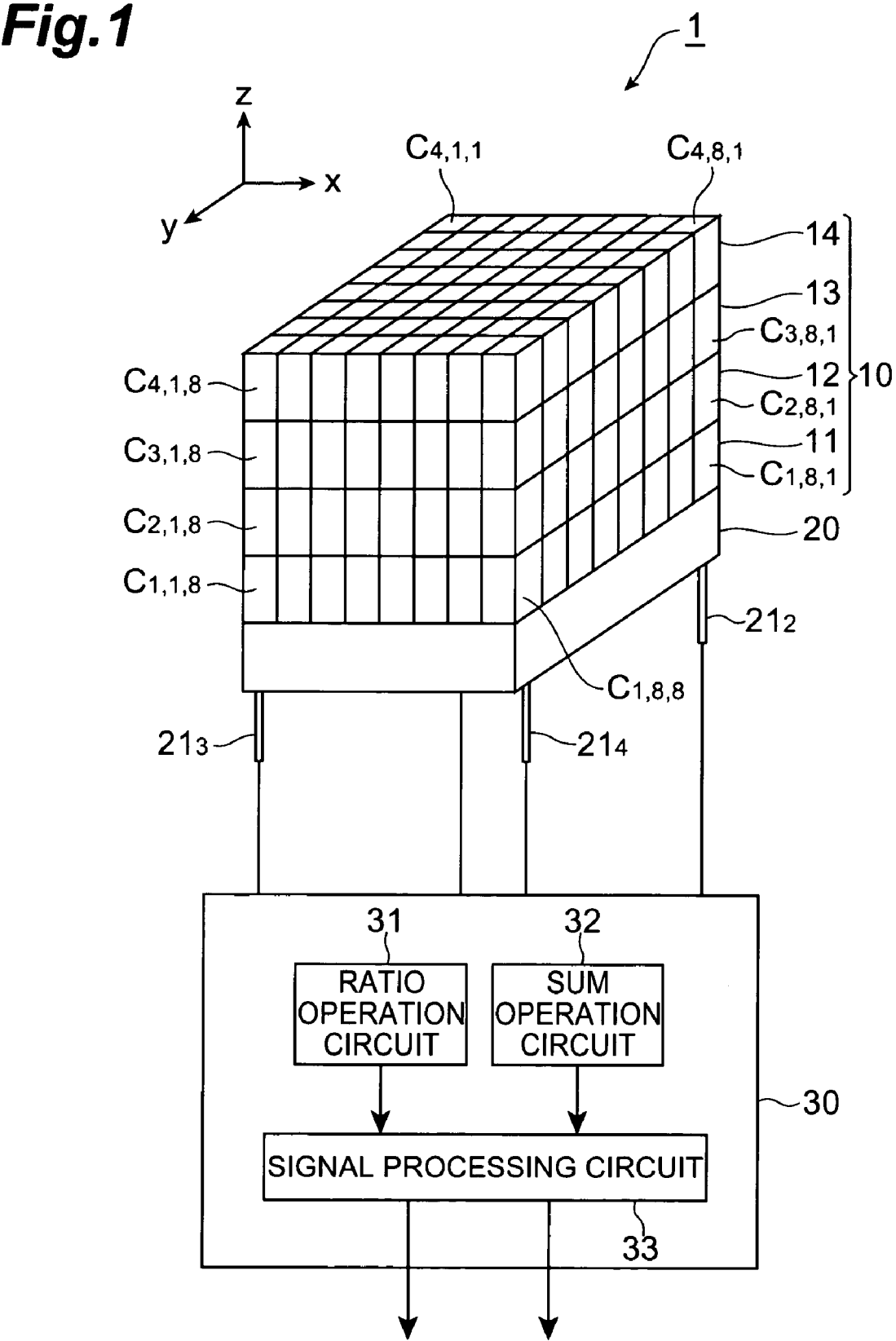
FIG. 1 is a diagram showing a constitution of a radiation three-dimensional position detector 1 in accordance with a first embodiment.

Hereinafter, referring to the attached drawings, preferred embodiments of the invention modes for carrying out the present invention will be described in detail. In the description of the drawings, the identical elements will be designated with identical reference numerals and letters, and redundant description will be omitted. Also, in the respective drawings, for convenience, a xyz Cartesian coordinate system is indicated.

First of all, a first embodiment of a radiation three-dimensional position detector in accordance with the present invention will be described. FIG. 1 is a diagram showing a constitution of the radiation three-dimensional position detector 1 in accordance with a first embodiment. The radiation three-dimensional position detector 1 shown in FIG. 1 comprises a scintillator unit 10, a light receiving element 20 and an operation section 30. In FIG. 1, the scintillator unit 10 and the light receiving element 20 are shown with a perspective view, while the operation section 30 is shown with a block diagram.

The light receiving element 20 outputs electric signal corresponding to the incident position and intensity of light incident on a light incident plane. The x-y plane in the xyz Cartesian coordinate system is set to be parallel to the light incident plane. The light receiving element 20 is, for example, a position transducer type photomultiplier. Also, as a position transducer type photomultiplier, a multi-anode type photomultiplier is appropriately used. The multi-anode type photomultiplier is provided with a plurality of anodes arrayed in two dimensions and anode terminals corresponding to the respective anodes. The respective anode terminals are connected to four output terminals $21_1$–$21_4$ being interposed by a resister respectively, and the electric signals from each anode are finally output from the four output terminals $21_1$–$21_4$ (Japanese Unexamined Patent Application Publication (Tokukai) No. 2000-180551; particularly, refer to FIG. 5). The ratio of the values between the electric signals outputted from the four output terminals $21_1$–$21_4$ corresponds to the incident position of the light incident on the light incident plane, and the sum of the values of the electric signals output from the four output terminals $21_1$–$21_4$ results in a value corresponding to the light intensity.

The scintillator unit 10 is disposed on the light incident plane of the light receiving element 20, and is constituted by four scintillator arrays 11–14 being laminated in due order in the direction perpendicular to the light incident plane (z-axis direction). The scintillator unit 10 may be disposed directly on the light incident plane of the light receiving element 20, or may be disposed thereon being interposed by an optical coupling material (index matching material), fiber array, air layer or the like. Also, each of the four scintillator arrays 11–14 is constituted by a plurality of scintillator cells (in embodiment: 8×8) being arrayed in two dimensions. The array direction of these scintillator cells is the x-axis direction and y-axis direction.

The scintillator cell produces scintillation light corresponding to the absorption of radiation. For example, $Gd_2SiO_5$ (GSO) or $Bi_4Ge_3O_{12}$ (BGO) doped with Ce is used. The scintillator cell is cuboid in shape. Between any two scintillator arrays out of four scintillator arrays 11–14, there may exist a difference in terms of the composition of the scintillator cells as well as the fluorescence attenuation constant thereof relative to each other, but the composition of all scintillator cells may be mutually identical.

Here, in the four scintillator arrays 11–14, and in a scintillator array 1k in the k-th layer counted from the light receiving element 20, a scintillator cell disposed in a m-th row and a n-th column is denoted as $C_{k,m,n}$. In FIG. 1, some of 256 scintillator cells disposed in three dimensions as in 4 lays×8 rows×8 column are designated with a code of $C_{k,m,n}$.

The operation section 30 includes a ratio operation circuit 31, a sum operation circuit 32 and a signal processing circuit 33. The operation section 30 inputs electric signals outputted from the respective output terminals $21_1$–$21_4$ of the light receiving element 20 and performs a predetermined operation based on the electric signals. Here, it is assumed that the output terminal $21_1$ (not shown in FIG. 1) is located in the corner at the scintillator cell $C_{1,1,1}$; the output terminal $21_2$ is located in the corner at the scintillator cell $C_{1,8,1}$; the output terminal $21_3$ is located in the corner at the scintillator cell $C_{1,1,8}$; and the output terminal $21_4$ is located in the corner at the scintillator cell $C_{1,8,8}$.

The ratio operation circuit 31 calculates the incident position of the light in the light incident plane of the light receiving element 20 based on the ratio between the values of the electric signals output respectively out of the four output terminals $21_1$–$21_4$ of the light receiving element 20. To be more specific, when it is assumed that the value of the electric signal output from the output terminal $21_1$ is $I_1$; the value of the electric signal output from the output terminal $21_2$ is $I_2$; the value of the electric signal output from the output terminal $21_3$ is $I_3$; and the value of the electric signal output from the output terminal $21_4$ is $I_4$, the ratio operation circuit 31 calculates the incident position (x, y) of the light on the light incident plane of the light receiving element 20 based on the following formula:

$$x = (I_1 + I_3)/I_{a11} \quad (1a)$$

$$y = (I_1 + I_2)/I_{a11} \quad (1b)$$

$$I_{a11} = I_1 + I_2 + I_3 + I_4 \quad (1c)$$

Also, the sum operation circuit 32 calculates the intensity of the light incident on the light incident plane of the light receiving element 20 based on the sum $I_{a11}$ of the values of the electric signals output respectively from the four output terminals $21_1$–$21_4$ of the light receiving element 20.

The signal processing circuit 33 receives as its inputs the above described results in the ratio operation circuit 31 and the sum operation circuit 32 respectively, and calculates the position of the absorbed radiation and the absorbed radiation energy in the scintillator unit 10, and outputs the calculated results. Also, it is preferred that the operation section 30 calculates the absorbed radiation energy of each scintillator cell.

Figure 2:
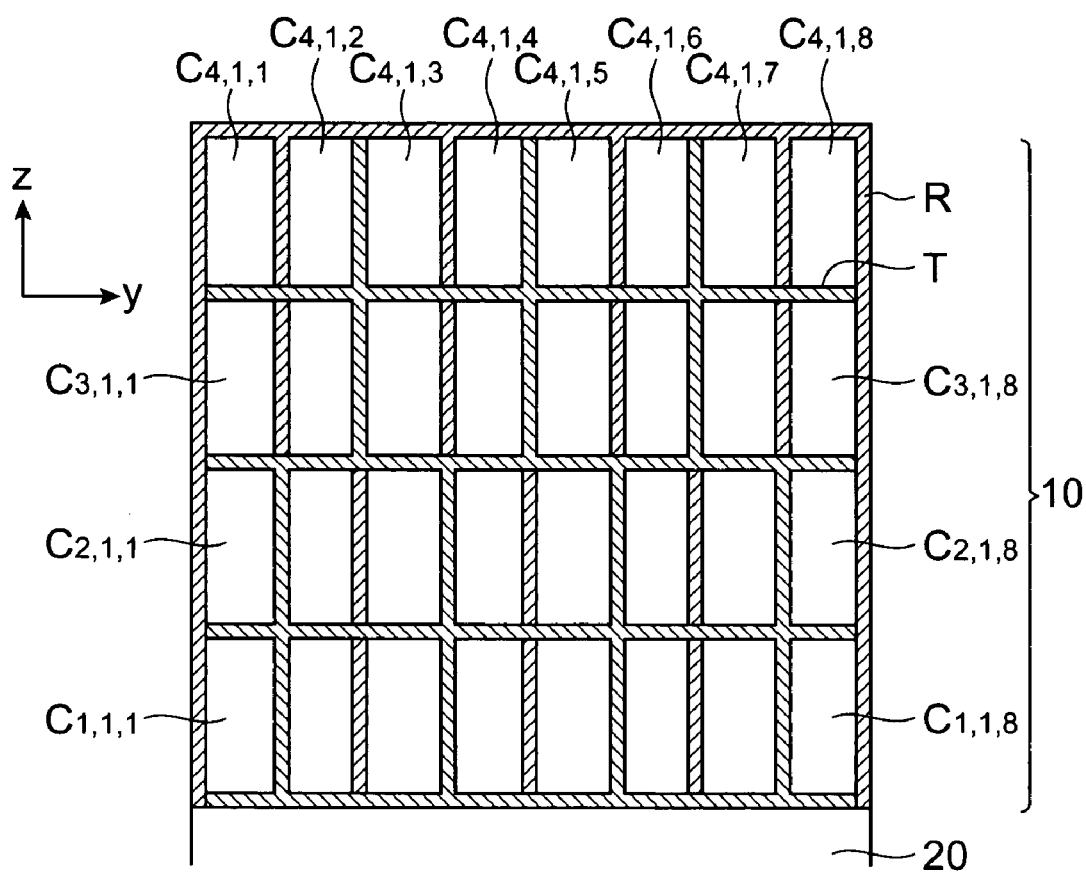
FIG. 2 is a y-z sectional view of a scintillator unit 10 in the first row of the scintillator unit 10 included in the radiation three-dimensional position detector 1 in accordance with the first embodiment.
Figure 3:
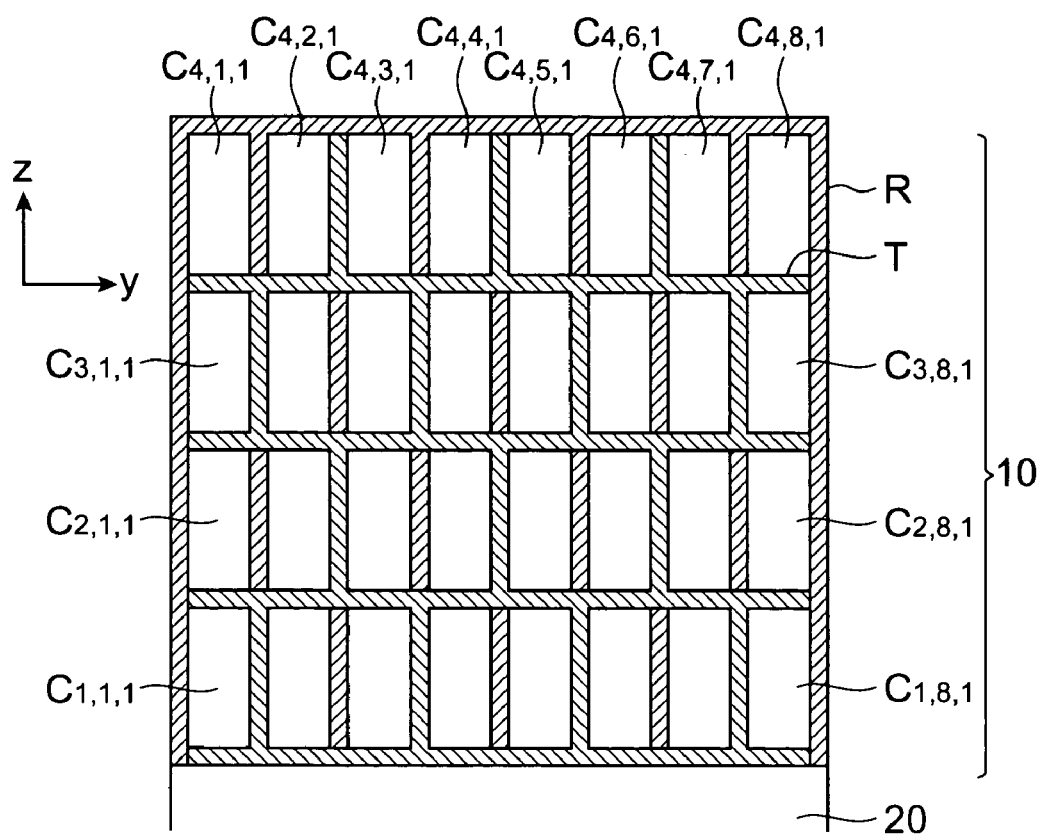
FIG. 3 is an x-z sectional view of the scintillator unit 10 in the first column of the scintillator unit 10 included in the radiation three-dimensional position detector 1 in accordance with the first embodiment.
Figure 4:
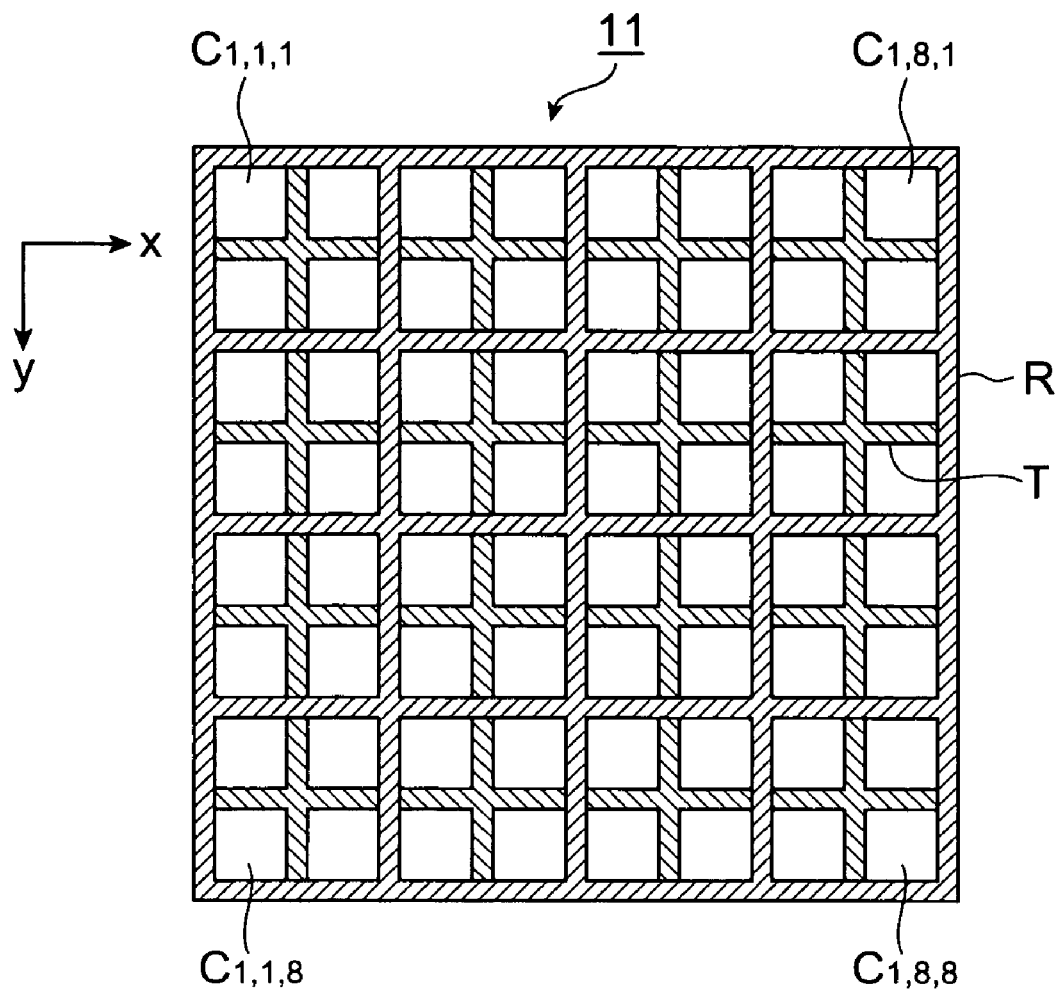
FIG. 4 is an x-y sectional view of a scintillator unit 11 in the first layer of the scintillator unit 10 included in the radiation three-dimensional position detector 1 in accordance with the first embodiment.
Figure 5:
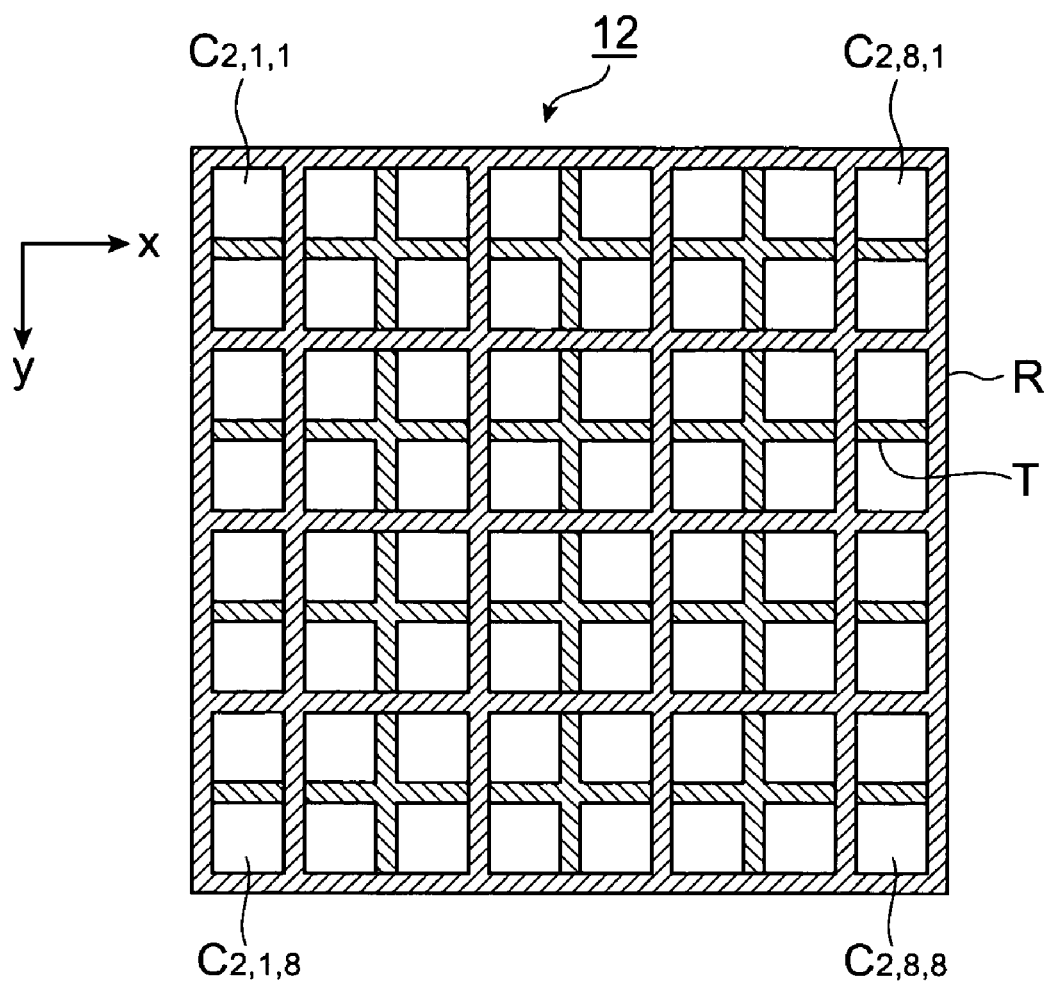
FIG. 5 is an x-y sectional view of a scintillator unit 12 in the second layer of the scintillator unit 10 included in the radiation three-dimensional position detector 1 in accordance with the first embodiment.
Figure 6:
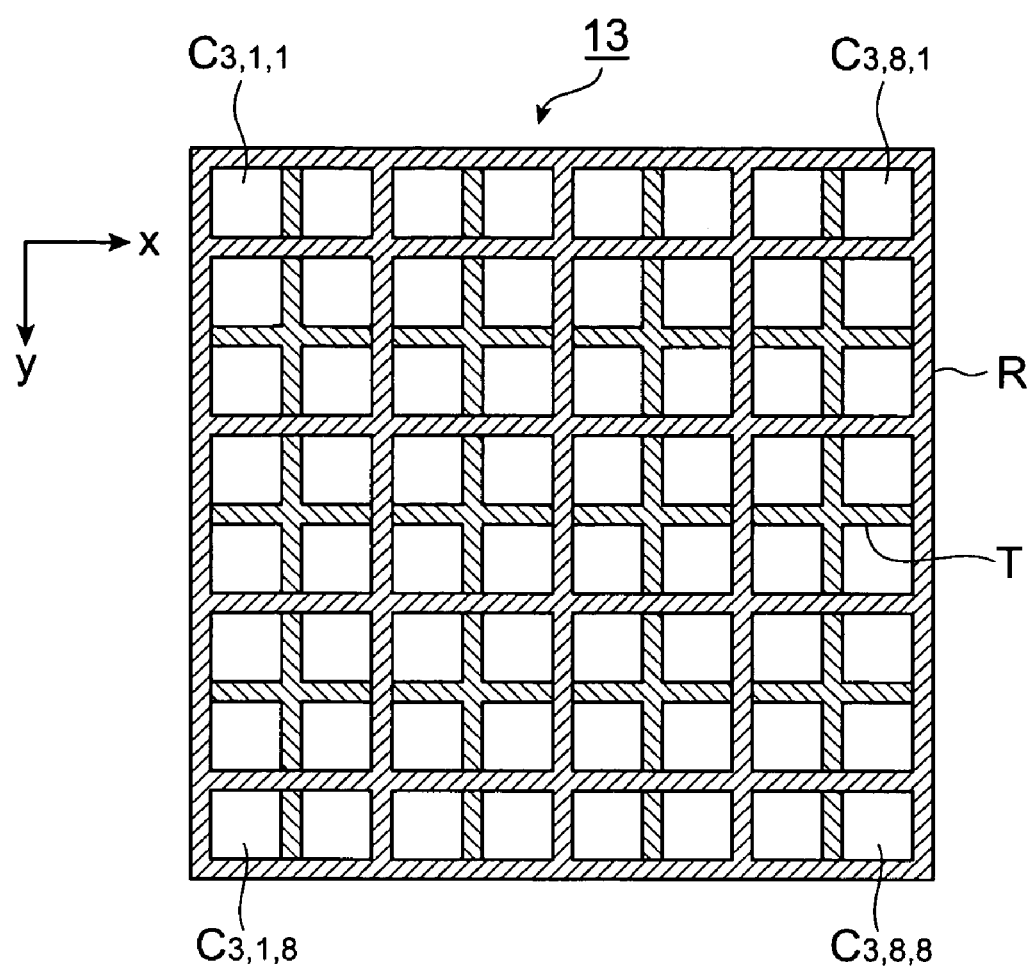
FIG. 6 is an x-y sectional view of a scintillator unit 13 in the third layer of the scintillator unit 10 included in the radiation three-dimensional position detector 1 in accordance with the first embodiment.
Figure 7:
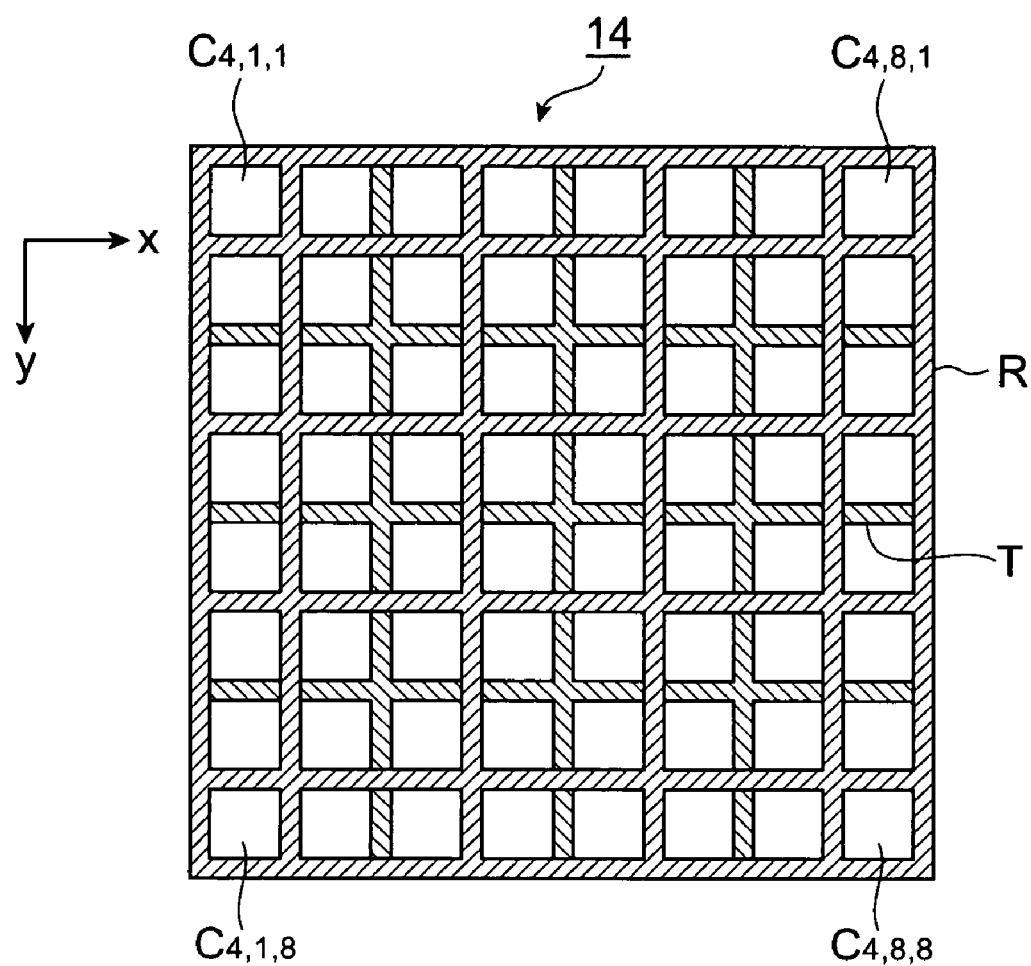
FIG. 7 is an x-y sectional view of a scintillator unit 14 in the fourth layer of the scintillator unit 10 included in the radiation three-dimensional position detector 1 in accordance with the first embodiment.

FIG. 2–FIG. 7 is a sectional view of the scintillator unit 10 respectively included in the radiation three-dimensional position detector 1 in accordance with the first embodiment. FIG. 2 is a y-z sectional view of the scintillator unit 10 in the first row (m=1). FIG. 3 is an x-z sectional view of the scintillator unit 10 in the first column (n=1). FIG. 4 is an x-y sectional view of the scintillator array 11 in the first layer (k=1). FIG. 5 is an x-y sectional view of the scintillator array 12 in the second layer (k=2). FIG. 6 is an x-y sectional view of the scintillator array 13 in the third layer (k=3) FIG. 7 is an x-y sectional view of the scintillator array 14 in the fourth layer (k=4) In these drawings, some scintillator cells only are given with a code $C_{k,m,n}$. And the scintillator cells with no code are identified with code $C_{k,m,n}$ in which any one of the suffixes k, m and n is increased by 1 in order.

In the scintillator array 11 in the first layer, the medium between the scintillator cell $C_{1,2,n}$ and the scintillator cell $C_{1,3,n}$, the medium between the scintillator cell $C_{1,4,n}$ and the scintillator cell $C_{1,5,n}$, the medium between the scintillator cell $C_{1,6,n}$ and the scintillator cell $C_{1,7,n}$, the medium between the scintillator cell $C_{1,m,2}$ and the scintillator cell $C_{1,m,3}$, the medium between the scintillator cell $C_{1,m,4}$ and the scintillator cell $C_{1,m,5}$, and the medium between the scintillator cell $C_{1,m,6}$ and the scintillator cell $C_{1,m,7}$ are made up of a reflective material R respectively, which has a high reflectance with respect to the scintillation light. Here, m and n are an integer number between 1–8 respectively. The medium between the other scintillations is made up of a translucent material T, which has a high transmittance with respect to the scintillation light.

In the scintillator array 12 in the second layer, the medium between the scintillator cell $C_{2,1,n}$ and the scintillator cell $C_{2,2,n}$, the medium between the scintillator cell $C_{2,3,n}$ and the scintillator cell $C_{2,4,n}$, the medium between the scintillator cell $C_{2,5,n}$ and the scintillator cell $C_{2,6,n}$, the medium between the scintillator cell $C_{2,7,n}$ and the scintillator cell $C_{2,8,n}$, the medium between the scintillator cell $C_{2,m,2}$ and the scintillator cell $C_{2,m,3}$, the medium between the scintillator cell $C_{2,m,4}$ and the scintillator cell $C_{2,m,5}$ and the medium between the scintillator cell $C_{2,m,6}$ and the scintillator cell $C_{2,m,7}$ are made up of a reflective material R respectively, which has a high reflectance with respect to the scintillation light. The medium between the other scintillations is made up of a translucent material T, which has a high transmittance with respect to the scintillation light.

In the scintillator array 13 in the third layer, the medium between the scintillator cell $C_{3,2,n}$ and the scintillator cell $C_{3,3,n}$, the medium between the scintillator cell $C_{3,4,n}$ and the scintillator cell $C_{3,5,n}$, the medium between the scintillator cell $C_{3,6,n}$ and the scintillator cell $C_{3,7,n}$, the medium between the scintillator cell $C_{3,m,1}$ and the scintillator cell $C_{3,m,2}$, the medium between the scintillator cell $C_{3,m,4}$ and the scintillator cell $C_{3,m,5}$ and the scintillator cell $C_{3,m,6}$, and the medium between the scintillator cell $C_{3,m,7}$ and the scintillator cell $C_{3,m,8}$ are made up of a reflective material R respectively, which has a high reflectance with respect to the scintillation light. The medium between the other scintillations is made up of a translucent material T, which has a high transmittance with respect to the scintillation light.

In the scintillator array 14 in the fourth layer, the medium between the scintillator cell $C_{4,1,n}$, and the scintillator cell $C_{4,2,n}$, the medium between the scintillator cell $C_{4,3,n}$ and the scintillator cell $C_{4,4,n}$, the medium between the scintillator cell $C_{4,5,n}$ and the scintillator cell $C_{4,6,n}$, the medium between the scintillator cell $C_{4,7,n}$ and the scintillator cell $C_{4,8,n}$, the medium between the scintillator cell $C_{4,m,1}$ and the scintillator cell $C_{4,m,2}$, the medium between the scintillator cell $C_{4,m,4}$ and the scintillator cell $C_{4,m,4}$, the medium between the scintillator cell $C_{4,m,5}$ and the scintillator cell $C_{4,m,6}$, and the medium between the scintillator cell $C_{4,m,7}$ and the scintillator cell $C_{4,m,8}$, are made up of a reflective material R respectively, which has a high reflectance with respect to the scintillation light. The medium between the other scintillations is made up of a translucent material T, which has a high transmittance with respect to the scintillation light.

Further, in the external surfaces of the entire scintillator unit 10, the surface, which comes into contact with the light incident plane of the light receiving element 10, is covered with a translucent material T that has a high transmittance with respect to the scintillation light, and the other surfaces are covered with a reflective material R, which has a high reflectance with respect to the scintillation light. In FIG. 1, the reflective material R on the external surfaces of the scintillator unit 10 is not shown. Furthermore, the medium between the first layer scintillator array 11 and the second layer scintillator array 12, the medium between the second layer scintillator array 12 and the third layer scintillator array 13, and the medium between the third layer scintillator array 13 and the fourth layer scintillator array 14 are made up of a translucent material T respectively, which has a high transmittance with respect to the scintillation light.

As compared with the translucent material T, the reflective material R reflects the scintillation light with a higher reflectance. Also, as compared with the reflective material R, the translucent material T transmits the scintillation light with a higher transmittance. The reflective material R is composed of, for example, $BaSO_4$. Further, the translucent material T is composed of, for example, a material of the same composition as the scintillator cell, or composed of an optical coupling material such as silicon grease, or a gas such as air. In the FIGS. 2–7, the reflective material R is indicated with a common hatching; and the translucent material T is also indicated with a common hatching (a hatching different from that of the reflective material R) respectively.

As described above, in the scintillator unit 10, the optical conditions pertaining to at least one side surface are different from each other between the scintillator cell $C_{k1,m,n}$ included in the scintillator array in the k1-layer and the scintillator cell $C_{k2,m,n}$ included in the scintillator array in the k2-th layer, (here, 1<m<8,1<n<8).

Particularly, in the first embodiment, in the scintillator array in the k1-the layer of the four scintillator arrays 11–14, the medium between the scintillator cell $C_{k1,p,n}$ and the scintillator cell $C_{k1,p+1,n}$, and the medium between the scintillator cell $C_{k1,m,q}$ and the scintillator cell $C_{k1,m,p+1}$ is made up of the reflective material R respectively with respect to the scintillation light, and the medium between the other scintillator cells is the translucent material T with respect to the scintillation light. Further, in the other scintillator array in the k2-the layer, the medium between the scintillator cell $C_{k2,r,n}$ and the scintillator cell $C_{k2,r+1,n}$, and the medium between the scintillator cell $C_{k2,m,s}$ and the scintillator cell $C_{k2,m,s+1}$ is the reflective material R respectively with respect to the scintillation light, and the medium between the other scintillator cells is made up of the translucent material T with respect to the scintillation light. Here, p, q, r and s are an integer number respectively in an arithmetic progression with a tolerance of 2, wherein, "p≠r" or "q≠s".

The radiation three-dimensional position detector 1 in accordance with the first embodiment operates as described below. When a radiation (for example, γ-ray) is made incident on the scintillator unit 10 of the radiation three-dimensional position detector 1 and the radiation is absorbed in any one of the scintillator cells in the scintillator unit 10, in the scintillator cell, which has absorbed the radiation, scintillation light of a intensity corresponding to the absorbed radiation energy is produced. The scintillation light travels from the produced point toward every direction, and is reflected and guided by the reflective material R, and finally is made incident on the light incident plane of the light receiving element 20.

The position of the barycenter of the scintillation light incident on the light incident plane of the light receiving element 20 corresponds to the X-coordinate value and y-coordinate value (i.e., m-value and n-value) of the scintillation light generation point (i.e., position of the absorbed radiation). Furthermore, since the reflective material R and the translucent material T are appropriately disposed, even when the position of the scintillator cell, which has produced the scintillation light corresponding to the absorption of the radiation, is far from the light incident plane of the light receiving element 20, the range of the intensity distribution of the scintillation light which reaches the light incident plane of the light receiving element 20 is narrow. Also, viewed in the lamination direction of the layers, as for the scintillation light produced by the respective scintillator cells located in the same position in the respective scintillator arrays, the position of the barycenter in the light incident plane of the light receiving element 20 is satisfactorily separated from each other. Accordingly, it is possible to increase the number of the layers of the scintillator arrays, and thus, results in an excellent detection accuracy of the position of the absorbed radiation.

Figure 8:
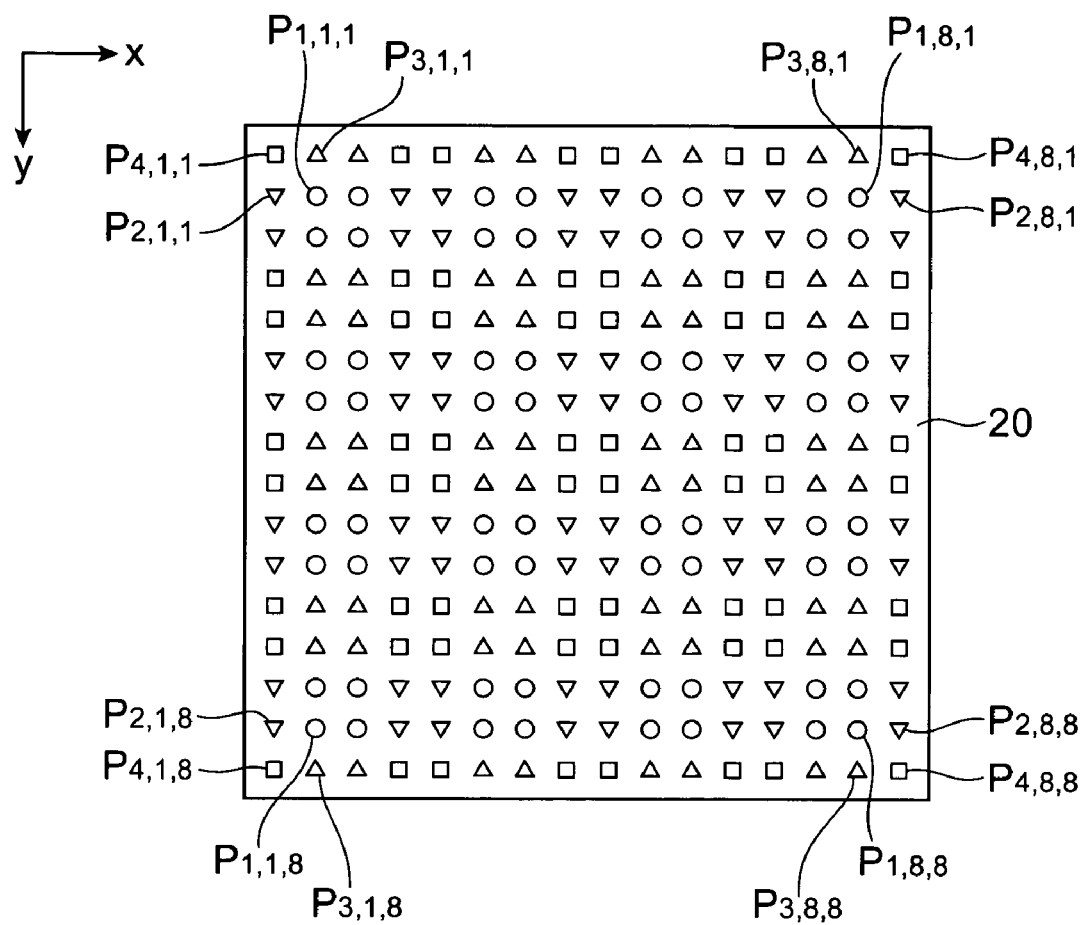
FIG. 8 is a diagram for illustrating the position of the barycenter of the incident of scintillation light on the light incident plane of the light receiving element 20 in the radiation three-dimensional position detector 1 in accordance with the first embodiment.

FIG. 8 is a diagram for illustrating the position of the barycenter of the incident of scintillation light on the light incident plane of the light receiving element 20 in the radiation three-dimensional position detector 1 in accordance with the first embodiment. In this figure, mark "o" indicates a position of the barycenter $P_{1,m,n}$ of an incidence of scintillation light, which is produced in each scintillator cell $C_{1,m,n}$ included in the first layer scintillator array 11, on the light incident plane. Mark "∇" indicates a position of the barycenter $P_{2,m,n}$ of an incidence of scintillation light, which is produced in each scintillator cell $C_{2,m,n}$ included in the second layer scintillator array 12, on the light incident plane. Mark "Δ" indicates a position of the barycenter $P_{3,m,n}$ of an incidence of scintillation light, which is produced in each scintillator cell $C_{3,m,n}$ included in the third layer scintillator array 13, on the light incident plane. And mark " " indicates a position of the barycenter $P_{4,m,n}$ of an incidence of scintillation light, which is produced in each scintillator cell $C_{4,m,n}$ included in the fourth layer scintillator array 14, on the light incident plane. In these drawings, some scintillator cells only are given with a code $C_{k,m,n}$. And the scintillator cells with no code are identified with code $C_{k,m,n}$ in which any one of the suffixes k, m and n is increased by 1 in order. As shown in this diagram, the scintillation light produced in each of the plural scintillator cells arrayed in three dimensions in the scintillator unit 10 is made incident on a position of the barycenter different from each other on the light incident plane of the light receiving element 20; moreover, the position of the barycenter of each light incidence is satisfactorily recognizable.

Figure 9:
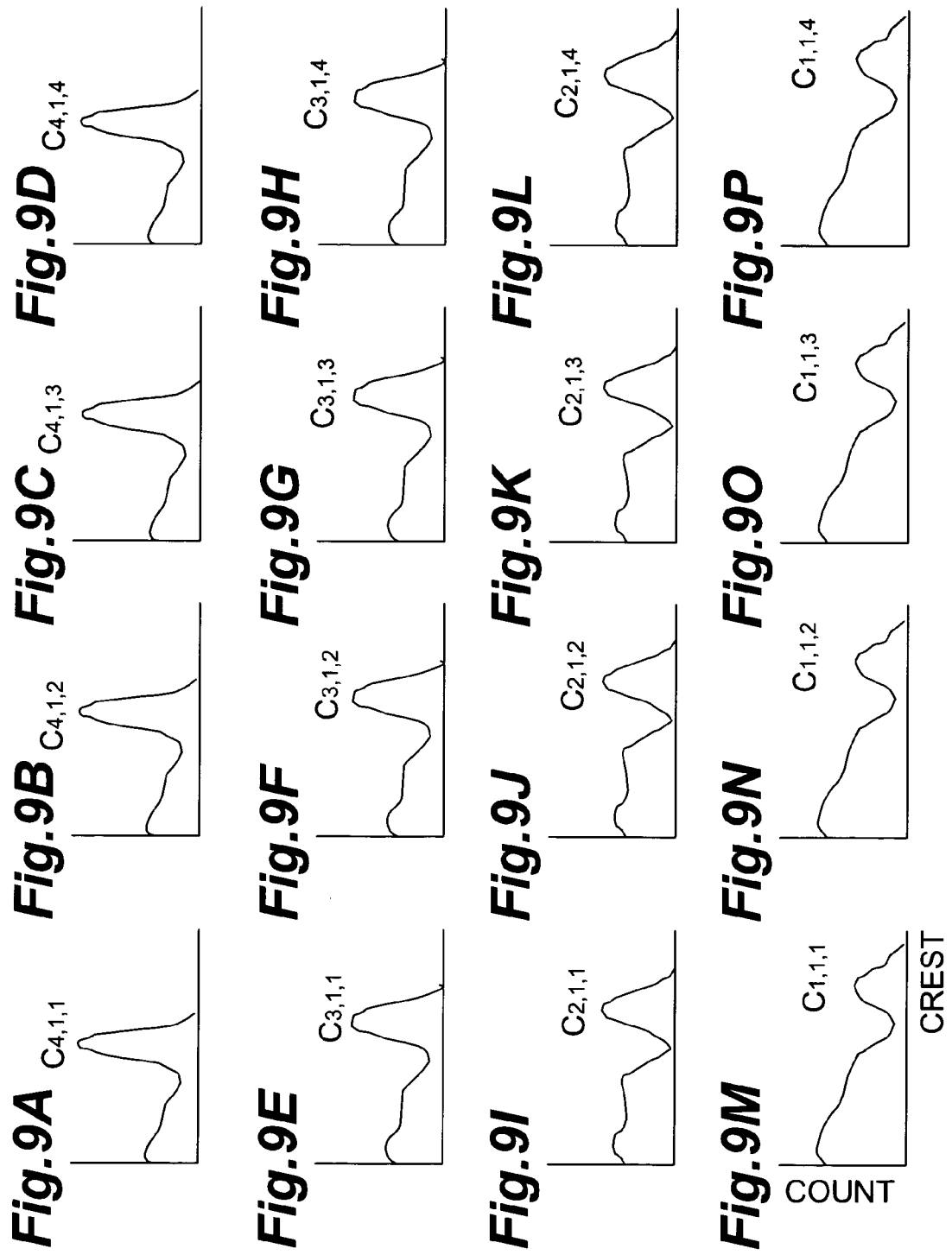
FIGS. 9A–9P are diagrams respectively showing crest distribution of light incident on the light incident plane of the light receiving element 20 in the radiation three-dimensional position detector 1 in accordance with the first embodiment.

FIGS. 9A–9P are diagrams respectively showing crest distribution of light incident on the light incident plane of the light receiving element 20 in the radiation three-dimensional position detector 1 in accordance with the first embodiment. Here, assuming that the energy of radiation incident on the scintillator unit 10 is uniform, crest distribution of light incident on the light incident plane of the light receiving element 20 when the radiation is absorbed in each of the scintillator cells $C_{1,1,1}$–$C_{1,1,4}$, $C_{2,1,1}$–$C_{2,1,4}$, $C_{3,1,1}$–$C_{3,1,4}$ and $C_{4,1,1}$–$C_{4,1,4}$ is indicated respectively.

Accordingly, from the values of the electric signals respectively output from the four output terminals $21_1$–$21_4$ of the light receiving element 20, the ratio operation circuit 31 calculates the incident position of the scintillation light on the light incident plane of the light receiving element 20 based on the above-described formulas (1a)–(1c), and refers to a table (for example, FIG. 8), which is previously created and stored in a memory within the ratio operation circuit 31 and indicates the relationship between the light incident position in the light incident plane of the light receiving element 20 and the position of the absorbed radiation in the scintillator unit 10; whereby it is possible to determine which scintillator cell of the plurality of scintillator cells arrayed in three dimensions in the scintillator unit 10 has absorbed the radiation. Based on the sum of the values of the electric signals output respectively from the four output terminals 21$_1$–21$_4$ of the light receiving element 20, the sum operation circuit 32 calculates the absorbed radiation energy.

Figure 10:
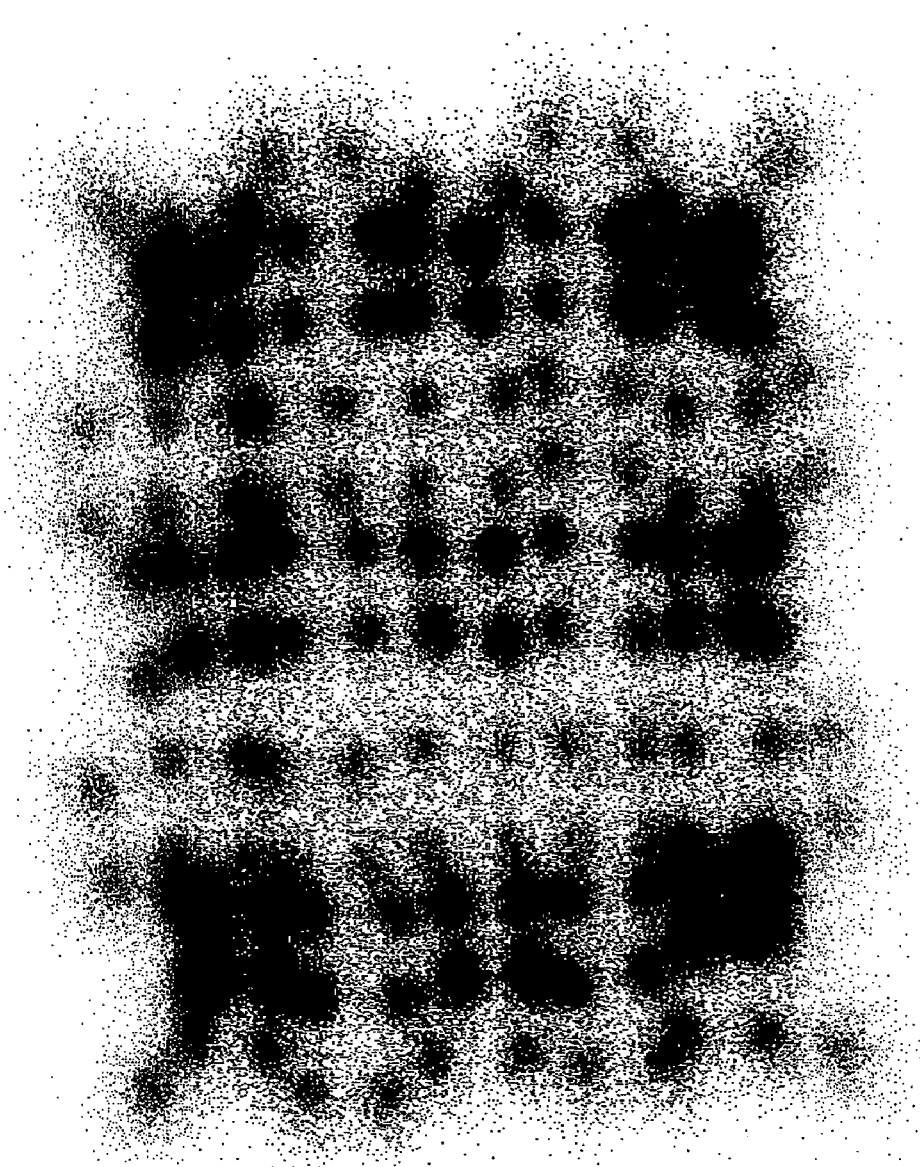
FIG. 10 is a diagram showing the intensity distribution of scintillation light incidence on the light incident plane in the light receiving element of the radiation three-dimensional position detector in an example.

Next, an example of the radiation three-dimensional position detector in accordance with the present invention will be described. In the radiation three-dimensional position detector of the example, the scintillator unit includes scintillator arrays laminated into four layers, and in each scintillator array, scintillator cells of 6×6 are arrayed in two dimensions. FIG. 10 is a diagram showing the intensity distribution of scintillation light incidence on the light incident plane in the light receiving element of the radiation three-dimensional position detector in the example. FIGS. 11A–11I are diagrams respectively showing the crest distribution of light incident on the light incident plane in the light receiving element of the radiation three-dimensional position detector in the example. Here, it is assumed that the energy of the radiation made incident on the scintillator unit is uniform, and that radiation enters uniformly thereinto. FIGS. 11A–11I show the crest distribution of light incident on the light incident plane in the light receiving element 20 when the radiation is absorbed in each of scintillator cells $C_{1,3,3}$–$C_{2,3,3}$ and $C_{1,6,4}$–$C_{4,6,4}$.

Figure 12B:
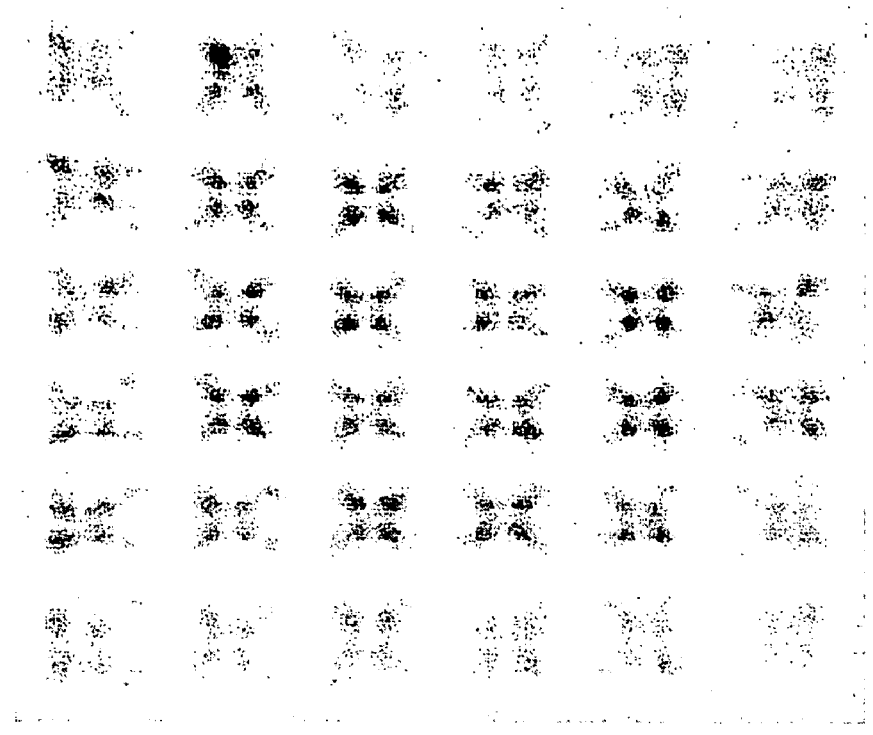
FIGS. 12A and 12B are diagrams respectively showing the intensity distribution of scintillation light incidence on the light incident plane in the light receiving element of a radiation three-dimensional position detector of a comparison example.
Figure 12A:
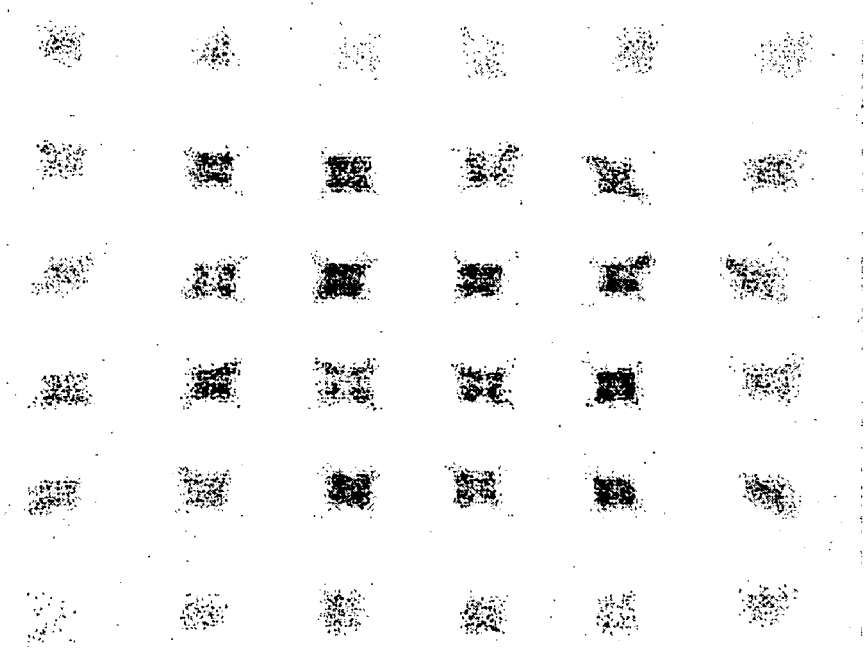

FIGS. 12A and 12B are diagrams respectively showing the intensity distribution of scintillation light incidence on the light incident plane in the light receiving element of a radiation three-dimensional position detector of a comparison example. The radiation three-dimensional position detector of the comparison example has a constitution disclosed in the Non-patent document 1 mentioned in the Related Art.

As demonstrated by comparison between the example (FIG. 10) and a comparison example (FIGS. 12A and 12B), in the radiation three-dimensional position detector 1 in accordance with the first embodiment, even when the location of a scintillator cell which produces scintillation light corresponding to the absorption of the radiation is far from the light incident plane in the light receiving element, the range of the intensity distribution of the scintillation light which has reached the light incident plane of the light receiving element is narrower. Also, viewed from the lamination direction of the layers, the position of the barycenter of the scintillation light produced by each scintillator cell located in the same position of each scintillator array satisfactorily separates in the light incident plane of the light receiving element. Therefore, it is possible to increase the number of the laminated scintillator arrays, and thus, resulting in a superior detection accuracy of the position of the absorbed radiation. Accordingly, by applying the radiation three-dimensional position detector 1 to a PET apparatus, it is possible to measure a subject with a high sensitivity, high resolution and high speed.

Next, a second embodiment of the radiation three-dimensional position detector in accordance with the present invention will be described. The radiation three-dimensional position detector in accordance with the second embodiment has the same constitution as that shown in FIG. 1 except the constitution of the scintillator unit 10. That is, the scintillator unit 10 in the second embodiment includes scintillator arrays 11–16 of six layers; in each of these scintillator arrays 11–16, scintillator cells of 12 rows and 12 columns are arrayed in two dimensions (K=6,M=N=12). Further, the mode of disposition of the reflective material R and the translucent material T between the scintillator cells is different from that in the first embodiment.

Figure 13:
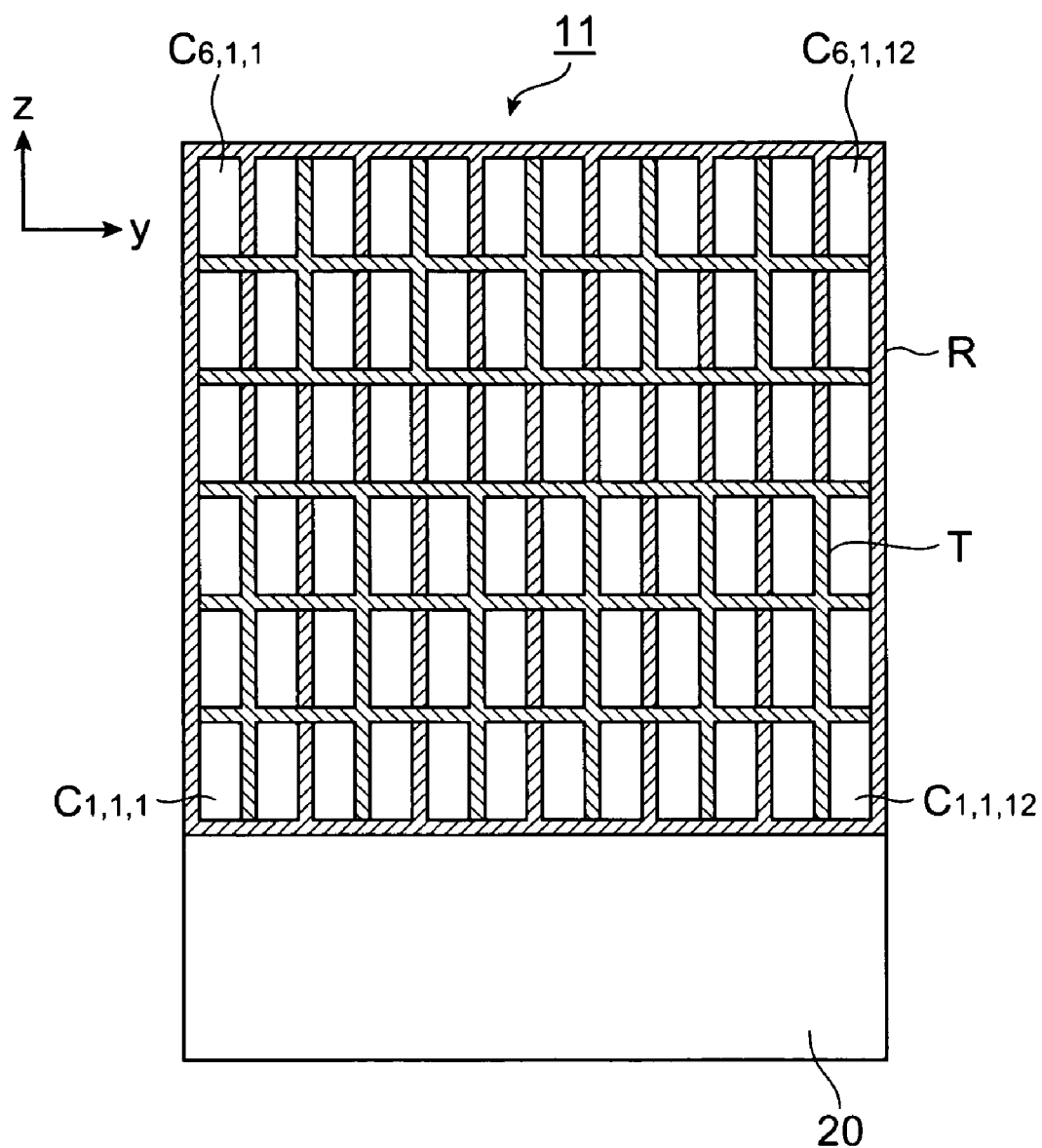
FIG. 13 is a y-z sectional view of a scintillator unit 10 in the first row of the scintillator unit 10 included in the radiation three-dimensional position detector 1 in accordance with a second embodiment.
Figure 14:
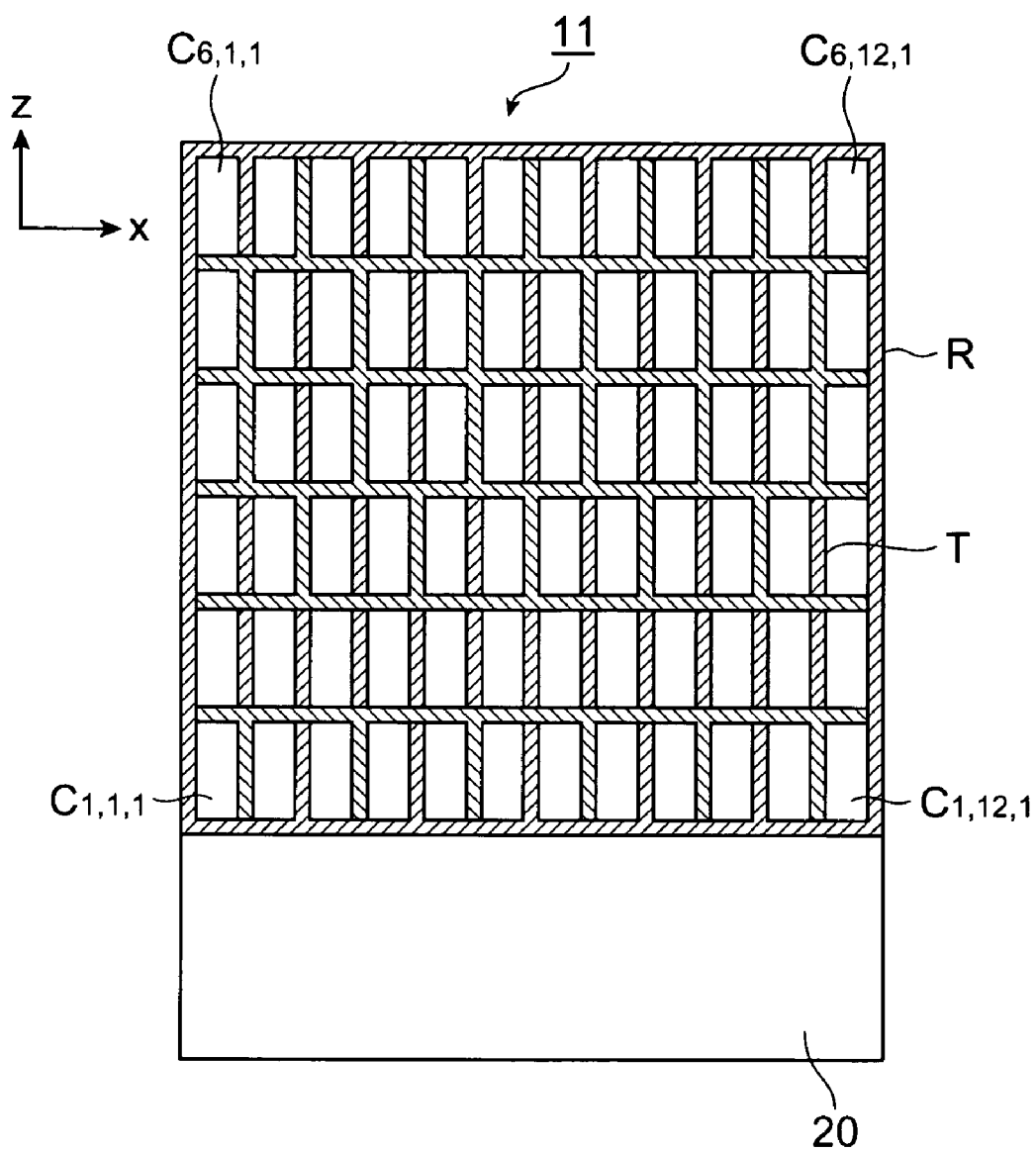
FIG. 14 is an x-z sectional view of a scintillator unit 10 in the first column of the scintillator unit 10 included in the radiation three-dimensional position detector 1 in accordance with the second embodiment.
Figure 15:
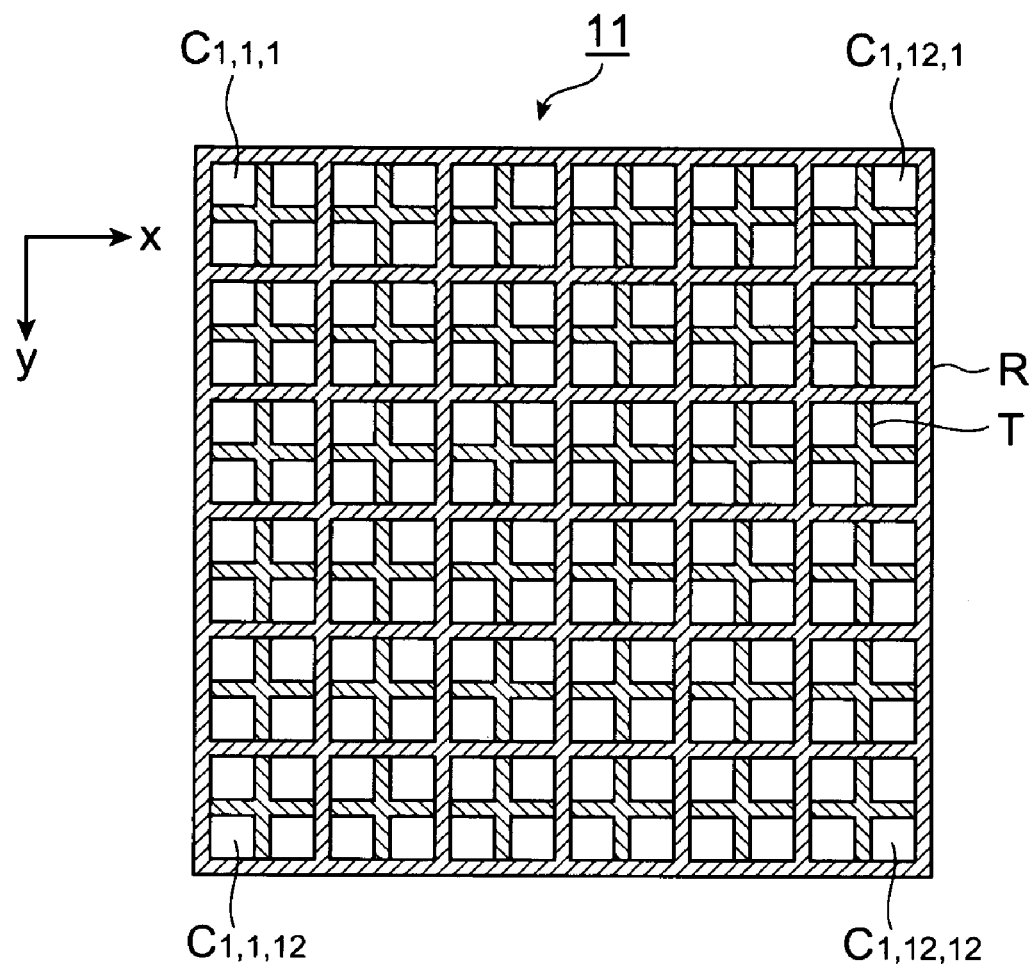
FIG. 15 is an x-y sectional view of a scintillator array 11 in the first layer of the scintillator unit 10 included in the radiation three-dimensional position detector 1 in accordance with the second embodiment.
Figure 16:
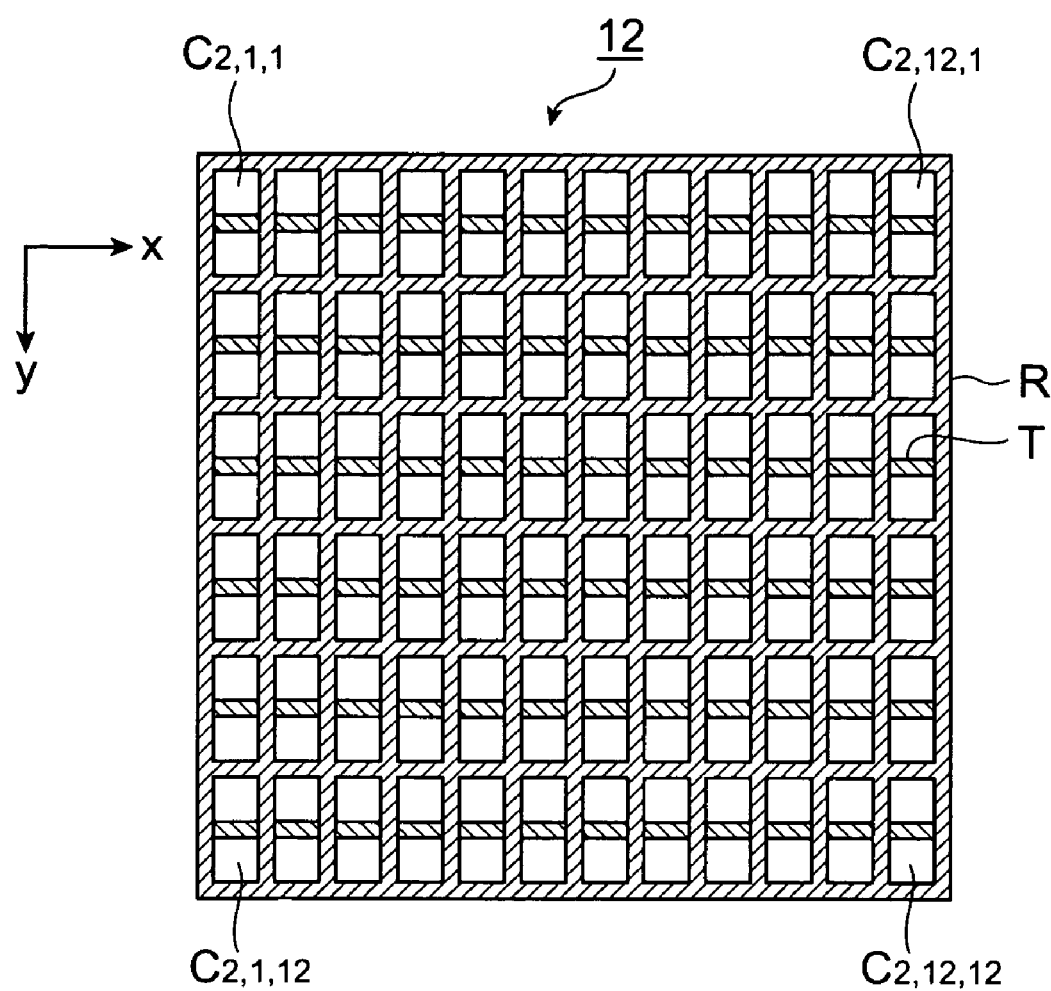
FIG. 16 is an x-y sectional view of a scintillator array 12 in the second layer of the scintillator unit 10 included in the radiation three-dimensional position detector 1 in accordance with the second embodiment.
Figure 17:
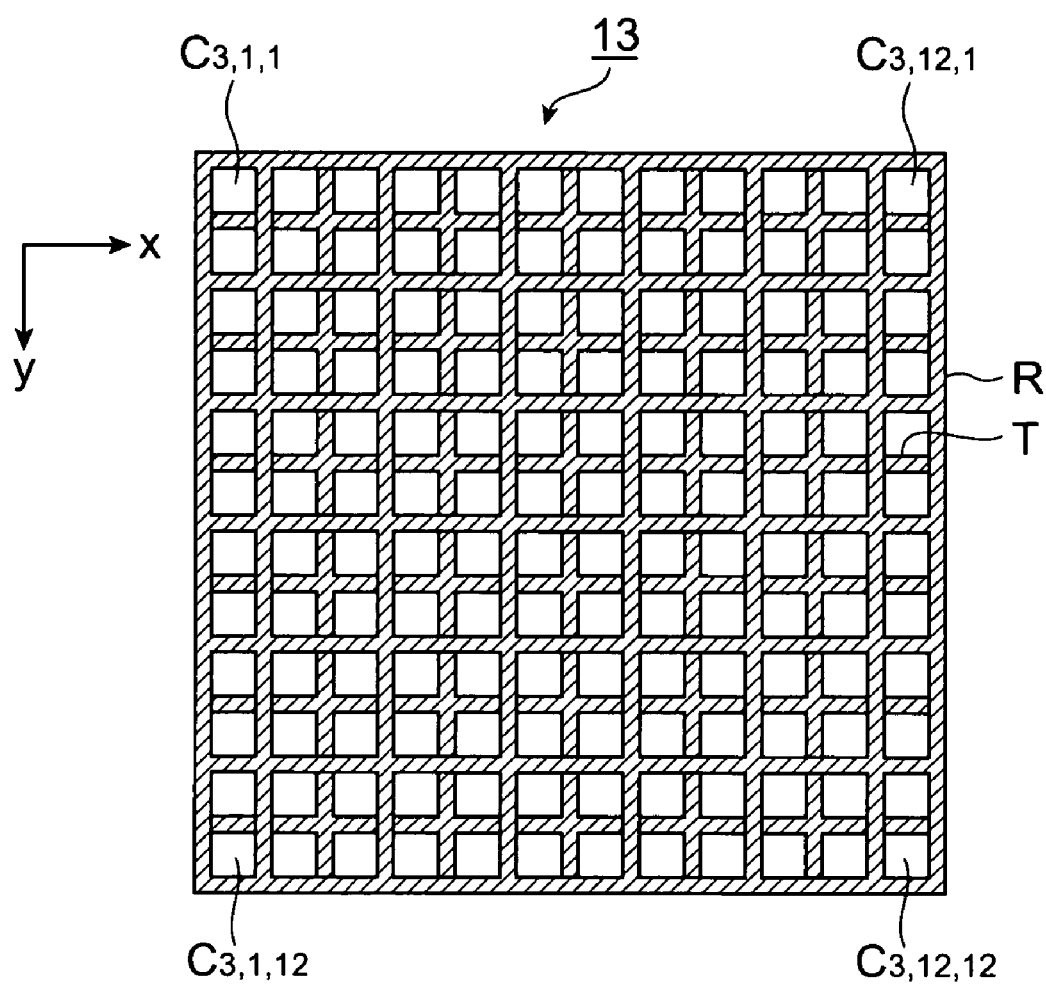
FIG. 17 is an x-y sectional view of a scintillator array 13 in the third layer of the scintillator unit 10 included in the radiation three-dimensional position detector 1 in accordance with the second embodiment.
Figure 18:
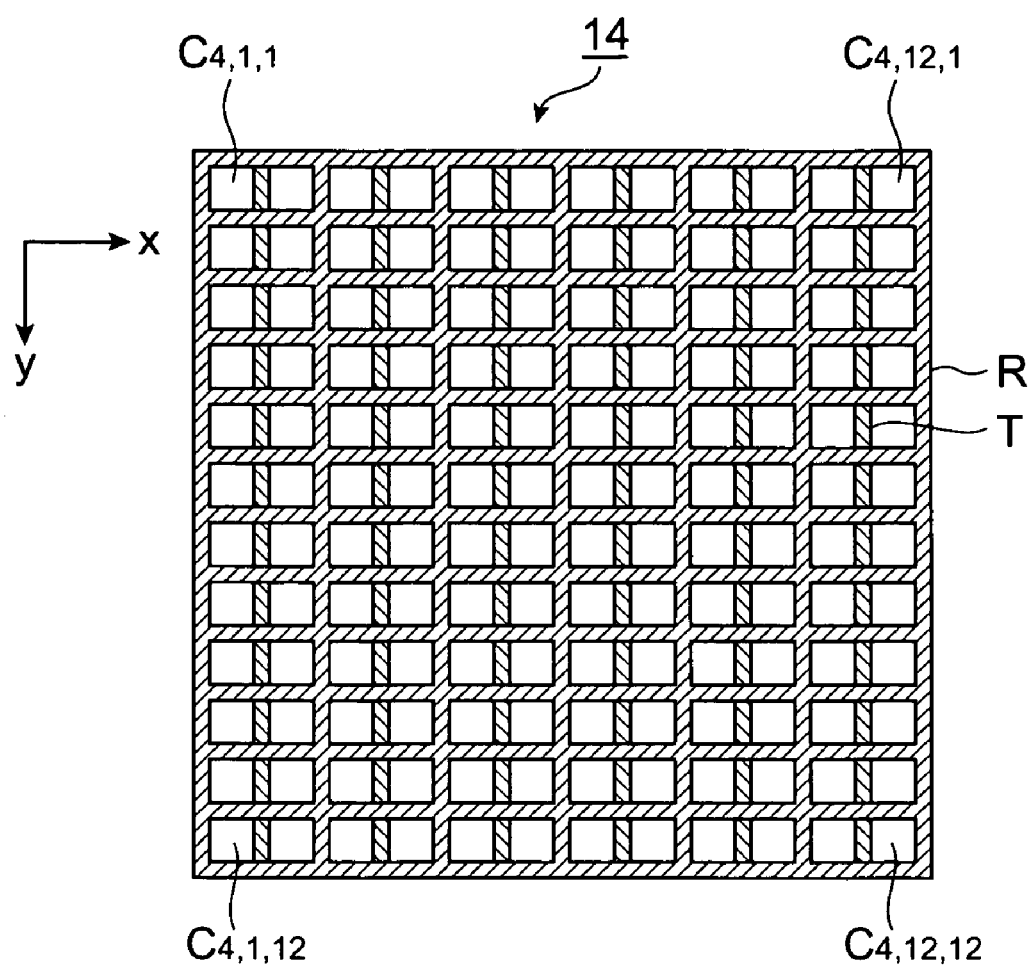
FIG. 18 is an x-y sectional view of a scintillator array 14 in the fourth layer of the scintillator unit 10 included in the radiation three-dimensional position detector 1 in accordance with the second embodiment.
Figure 19:
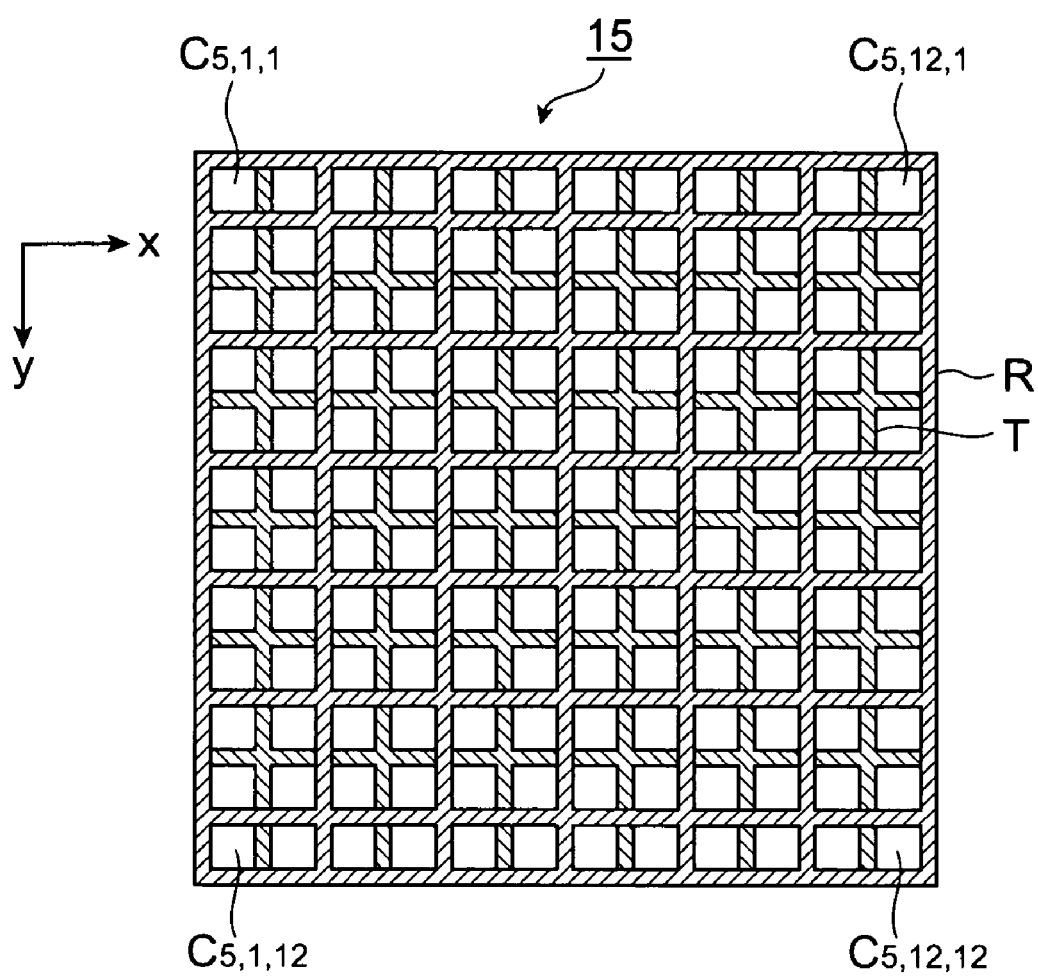
FIG. 19 is an x-y sectional view of a scintillator array 15 in the fifth layer of the scintillator unit 10 included in the radiation three-dimensional position detector 1 in accordance with the second embodiment.
Figure 20:
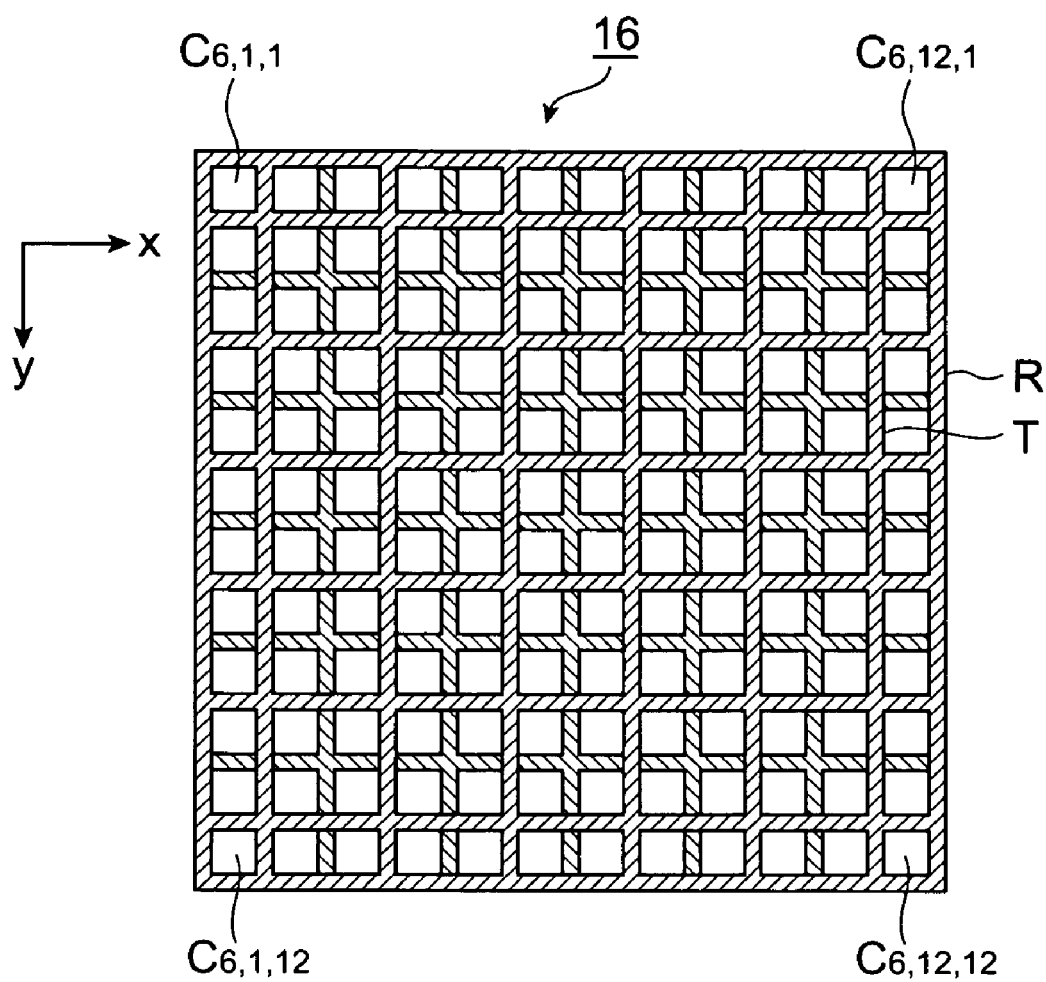
FIG. 20 is an x-y sectional view of a scintillator array 16 in the sixth layer of the scintillator unit 10 included in the radiation three-dimensional position detector 1 in accordance with the second embodiment.

FIGS. 13–20 are a sectional view respectively of the scintillator unit 10 included in the radiation three-dimensional position detector in accordance with the second embodiment. FIG. 13 is a y-z sectional view of the scintillator unit 10 in the first row (m=1). FIG. 14 is an x-z sectional view of the scintillator unit 10 in the first column (n=1). FIG. 15 is an x-y sectional view of a scintillator array 11 in the first layer (k=1). FIG. 16 is an x-y sectional view of a scintillator array 12 in the second layer (k=2). FIG. 17 is an x-y sectional view of a scintillator array 13 in the third layer (k=3). FIG. 18 is an x-y sectional view of a scintillator array 14 in the fourth layer (k=4) FIG. 19 is an x-y sectional view of a scintillator array 15 in the fifth layer (k=5). And FIG. 20 is an x-y sectional view of a scintillator array 16 in the sixth layer (k=5). In these drawings, some scintillator cells only are designated with a code $C_{k,m,n}$. And the scintillator cells with no code are identified with code $C_{k,m,n}$ in which any one of the suffixes k, m and n is increased by 1 in order.

In the scintillator array 11 of the first layer, the medium between the scintillator cell $C_{1,p,n}$ and the scintillator cell $C_{1,p+1,n}$ (p is an integer number of 2, 4, 6, 8 and 10), and the medium between the scintillator cell $C_{1,m,q}$ and the scintillator cell $C_{1,m,q+1}$ (p is an integer number of 2, 4, 6, 8 and 10) are made up of the reflective material R, which has a high reflectance with respect to the scintillation light. The suffix m and n are an integer number between 1–12 respectively. The medium between the other scintillations is a translucent material T.

In the scintillator array 12 of the second layer, the medium between the scintillator cell $C_{2,p,n}$ and the scintillator cell $C_{2,p+1,n}$ (p is an integer number from 1 to 11), and the medium between the scintillator cell $C_{2,m,q}$ and the scintillator cell $C_{2,m,q+1}$ (p is an integer number of 2, 4, 6, 8 and 10) are made up of the reflective material R, which has a high reflectance with respect to the scintillation light. The medium between the other scintillations is made up of the translucent material T.

In the scintillator array 13 of the third layer, the medium between the scintillator cell $C_{3,p,n}$ and the scintillator cell $C_{3,p+1,n}$ (P is an integer 1, 3, 5, 7, 9 and 11), and the medium between the scintillator cell $C_{3,m,q}$ and the scintillator cell $C_{3,m,q+1}$ (p is an integer number of 2, 4, 6, 8 and 10) are made up of the reflective material R, which has a high reflectance with respect to the scintillation light. The medium between the other scintillations is made up of a translucent material T.

In the scintillator array 14 of the fourth layer, the medium between the scintillator cell $C_{4,p,n}$ and the scintillator cell $C_{4,p+1,n}$ (p is an integer number of 2, 4, 6, 8 and 10), and the medium between the scintillator cell $C_{4,m,q}$ and the scintillator cell $C_{4,m,q+1}$ (p is an integer number of 1–11) are made up of the reflective material R, which has a high reflectance with respect to the scintillation light. The medium between the other scintillations is made up of a translucent material T.

In the scintillator array 15 of the fifth layer, the medium between the scintillator cell $C_{5,p,n}$ and the scintillator cell $C_{5,p+1,n}$ (p is an integer number of 2, 4, 6, 8 and 10), and the medium between the scintillator cell $C_{5,m,q}$ and the scintillator cell $C_{5,m,q+1}$ (p is an integer 1, 3, 5, 7, 9 and 11) are made up of the reflective material R, which has a high reflectance with respect to the scintillation light. The medium between the other scintillations is made up of a translucent material T.

In the scintillator array 16 of the sixth layer, the medium between the scintillator cell $C_{6,p,n}$ and the scintillator cell $C_{5,p+1,n}$ (p is an integer 1, 3, 5, 7, 9 and 11), and the medium between the scintillator cell $C_{6,m,q}$ and the scintillator cell $C_{6,m,q+1}$ (p is an integer 1, 3, 5, 7, 9 and 11) are made up of the reflective material R, which has a high reflectance with respect to the scintillation light. The medium between the other scintillations is made up of a translucent material T.

Further, in the external surfaces of the entire scintillator unit 10, the surface, which comes into contact with the light incident plane of the light receiving element 10, is covered with a translucent material T that has a high transmittance with respect to the scintillation light, and the other surfaces are covered with a reflective material R, which has a high reflectance with respect to the scintillation light. Furthermore, the medium between the first layer scintillator array 11 and the second layer scintillator array 12, the medium between the second layer scintillator array 12 and the third layer scintillator array 13, the medium between the third layer scintillator array 13 and the forth layer scintillator array 14, the medium between the fourth layer scintillator array 14 and the fifth layer scintillator array 15, and the medium between the fifth layer scintillator array 15 and the sixth layer scintillator array 16 are made up of the translucent material T respectively, which has a high transmittance with respect to the scintillation light.

As compared with the translucent material T, the reflective material R reflects the scintillation light with a higher reflectance. Also, as compared with the reflective material R, the translucent material T transmits the scintillation light with a higher transmittance. In the FIGS. 13–20, the reflective material R is indicated with a common hatching; and the translucent material T is also indicated with a common hatching (a hatching different from that of the reflective material R) respectively.

As described above, in the scintillator unit 10, the optical conditions of at least one same side surface are different from each other between a scintillator cell $C_{k1,m,n}$ included in a scintillator array of the k1-th layer and a scintillator cell $C_{k2,m,n}$ included in a scintillator array of the k2-th layer (here, 1<m<12, 1<n<12). Particularly, in the second embodiment, in each of the scintillator arrays 11–16 of 6-th layer, the medium between two neighboring scintillators is any one of the reflective material R and the translucent material T with respect to the scintillation light, and is different from each other between the area covered with reflective material R in the scintillator array in the k1-th layer and the area covered with the reflective material R in the scintillator array in the k2-th layer viewed in the lamination direction of the layers.

Figure 21:
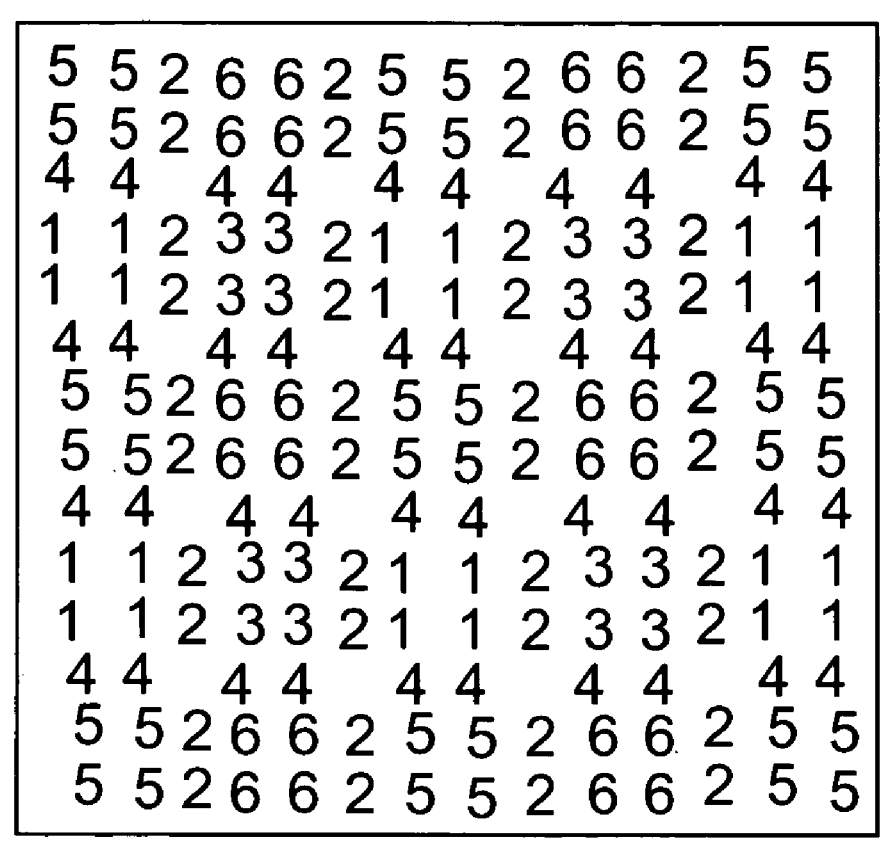

FIG. 21 is a diagram for illustrating the position of the barycenter of the incident of scintillation light on the light incident plane of the light receiving element 20 in the radiation three-dimensional position detector 1 in accordance with the second embodiment. In FIG. 21, code "1" indicates position of the barycenter of the incidence in the light incident plane of the scintillation light produced in each scintillator cell $C_{1,m,n}$ included in the scintillator array 11 of the first layer. Code "2" indicates position of the barycenter of the incidence in the light incident plane of the scintillation light produced in each scintillator cell $C_{2,m,n}$ included in the scintillator array 12 of the second layer. Code "3" indicates position of the barycenter of the incidence in the light incident plane of the scintillation light produced in each scintillator cell $C_{3,m,n}$ included in the scintillator array 13 of the third layer. Code "4" indicates position of the barycenter of the incidence in the light incident plane of the scintillation light produced in each scintillator cell $C_{4,m,n}$ included in the scintillator array 14 of the fourth layer. Code "5" indicates position of the barycenter of the incidence in the light incident plane of the scintillation light produced in each scintillator cell $C_{5,m,n}$ included in the scintillator array 15 of the fifth layer. And code "6" indicates position of the barycenter of the incidence in the light incident plane of the scintillation light produced in each scintillator cell $C_{6,m,n}$ included in the scintillator array 16 of the sixth layer. As shown in FIG. 21, in the scintillator unit 10, the scintillation light produced in each of the plural scintillator cells disposed in three dimensions is made incident on position of the barycenter different from each other on the light incident plane of the light receiving element 20, and the position of the barycenter of each light incidence is satisfactorily recognizable.

The present invention is not limited to the above-described embodiments but various modifications thereof are possible. For example, although the number of the layers of the scintillator arrays in the scintillator unit is, in the above embodiments, 4 or 6, but the number thereof may be 2, 3, 5, 7 or more. Also, the fluorescent attenuation constant of the scintillator cell may be different from each other depending on scintillator array. In this case, the number of the layers of the scintillator arrays in the scintillator unit can be further increased.

As described above, in the radiation three-dimensional position detector in accordance with the present invention, the position of the barycenter of the incidence of the scintillation light on the light incident plane in the light receiving element corresponds to the scintillation light production point (i.e., position of the absorbed radiation), and the optical conditions of each scintillator cell are appropriately adapted. Accordingly, even when the location of the scintillator cell which has produced the scintillation light corresponding to the absorption of the radiation is far from the light incident plane of the light receiving element, the range of the intensity distribution of the scintillation light which reaches the light incident plane of the light receiving element is narrow. Also, viewed in the lamination direction of the layers, the position of the barycenter of the scintillation light produced in each scintillator cell positioned in the same position of the respective scintillator array is satisfactorily separated from each other in the light incident plane of the light receiving element. Accordingly, it is possible to increase the number of the laminated scintillator arrays, and thus, resulting in an excellent detection accuracy of the position of the absorbed radiation.

What is claimed is:

1. A radiation three-dimensional position detector, comprising:
   a light receiving element having a light receiving plane, which outputs an electric signal corresponding to the incident position and intensity of light incident on the light receiving plane; and
   a scintillator unit having scintillator cells each of which produces scintillation light corresponding to the radiation absorbed thereby,
      wherein K layers of scintillator arrays (K is an integer number of 2 or greater), each having the scintillator cells arrayed in M rows–N columns two-dimensional matrix (each of M and N is an integer number of 2 or greater), are laminated on the light receiving plane of said light receiving element, wherein each of the scintillator cells is separated from the adjacent scintillator cells by partition mediums, and the partition mediums between scintillator cells are made up of either of a reflective material and a translucent material with respect to said scintillation light, and wherein at least one of side faces of a scintillator cell $C_{k1,m,n}$ included in a scintillator array of the k1-th layer is faced with the partition medium which has different optical characteristic from that of the partition medium facing the corresponding side face of a scintillator cell $C_{k2,m,n}$ included in a scintillator array of the k2-th layer, said corresponding side face being located at the same two-dimensional position as said one of side faces in a plane parallel to the light receiving plane, provided that $C_{k,m,n}$ is defined as a scintillator cell located at m-th row and a n-th column within a scintillator array of the k-th layer (1<k<K, 1<m<M, 1<n<N), and an area enclosed by the partition medium of the reflective material in said k1-th layer scintillator array occupies a different region in the plane parallel to the light receiving plane from a region occupied by an area enclosed by the partition medium of the reflective material in said k2-th layer scintillator array.

2. The radiation three-dimensional position detector according to claim 1, characterized in that said scintillator cell is cuboidal in shape.

3. The radiation three-dimensional position detector according to claim 2, characterized in that a position of the center of gravity of a light spot, where the scintillation light generated in one group of scintillator cells enclosed by the partition medium of the reflective material in a layer of the scintillator array reaches on the light receiving plane, is different from a position of the center of gravity of a light spot, where the scintillation light generated in the other group of scintillator cells enclosed by the partition medium of the reflective material in a layer of the scintillator array reaches on the light receiving plane.

4. The radiation three-dimensional position detector according to claim 3, further comprising an operation section, wherein said operation section calculates the position of the center of gravity of the light spot based on the electric signal, and calculates the three dimensional position where the radiation is absorbed in said scintillator unit based on the position of the center of gravity of the light spot on the light receiving plane.

5. The radiation three-dimensional position detector according to claim 1, characterized in that in said k1-th layer scintillator array, each partition medium between a scintillator cell $C_{k1,p,n}$ and a scintillator cell $C_{k1,p+1,n}$, and each partition medium between a scintillator cell $C_{k1,m,q}$ and a scintillator cell $C_{k1,m,q+1}$ are made up of reflective materials with respect to said scintillation light, and the other partition mediums are made up of translucent materials with respect to said scintillation light (each of p and q is an integer number in an arithmetic progression with a tolerance of 2,: 1≦p<M, 1≦q<N);

in said k2-th layer scintillator array, each partition medium between a scintillator cell $C_{k2,r,n}$ and a scintillator cell $C_{k2,r+1,n}$, and each partition medium between a scintillator cell $C_{k2,m,s}$ and a scintillator cell $C_{k2,m,s+1}$ are made up of reflective materials with respect to said scintillation light, and the other partition mediums are made up of translucent materials with respect to said scintillation light (each of r and s is an integer number in an arithmetic progression with a tolerance of 2,: 1≦r<M, 1≦s<N, "p≠r" and/or "q≠s").

6. The radiation three-dimensional position detector according to claim 1, characterized by further comprising an operation section that calculates the three dimensional position where the radiation is absorbed in said scintillator unit based on the electric signal, the electric signal being outputted from the light receiving element, wherein the scintillation light produced in the scintillation unit is made incident on the light receiving plane.

7. The radiation three-dimensional position detector according to claim 6, characterized in that said light receiving element has a plurality of output terminals for outputting said electric signals, and said operation section processes said electric signals outputted from the plurality of output terminals of said light receiving element to obtain an incident position of the scintillation light on said light receiving plane, and calculates the three dimensional position where the radiation is absorbed in said scintillator unit based on the incident position of the scintillation light.

8. The radiation three-dimensional position detector according to claim 6, characterized in that said light receiving element has a plurality of output terminals for outputting said electric signals, and said operation section calculates energy of the radiation absorbed in the scintillator unit based on a sum of values of electric signals outputted from the plurality of output terminals of said light receiving element.

9. The radiation three-dimensional position detector according to claim 6, characterized in that said light receiving element has a plurality of output terminals for outputting said electric signals, and said operation section calculates energy of the scintillation light generated in the scintillator unit based on a sum of values of electric signals outputted from the plurality of output terminals of said light receiving element.

10. The radiation three-dimensional position detector according to claim 6, characterized in that said operation section calculates energy of the radiation absorbed in each of the scintillator cells.

11. The radiation three-dimensional position detector according to claim 6, characterized in that said operation section calculates energy of the scintillation light generated in each of the scintillator cells.

12. A radiation three-dimensional position detector, comprising:

a light receiving element having a light receiving plane, which outputs an electric signal corresponding to the incident position and intensity of light incident on the light receiving plane; and a scintillator unit having scintillator cells each of which produces scintillation light corresponding to the radiation absorbed thereby, wherein K layers of scintillator arrays (K is an integer number of 2 or greater), each having the scintillator cells arrayed in M rows–N columns two-dimensional matrix (each of M and N is an integer number of 2 or greater), are laminated on the light receiving plane of said light receiving element, and wherein at least one of side faces of a scintillator cell $C_{k1,m,n}$ included in a scintillator array of the k1-th layer has different optical characteristic from that of the corresponding side face of a scintillator cell $C_{k2,m,n}$ included in a scintillator array of the k2-th layer, said corresponding side face being located at the same two-dimensional position as said one of side faces in a plane parallel to the light receiving plane, provided that $C_{k,m,n}$ is defined as a scintillator cell located at m-th row and a n-th column within a scintillator array of the k-th layer (1<k<K, 1<m<M, 1<n<N), and wherein in every layer at least one side face has different optical characteristic from those of the others.

13. A radiation three-dimensional position detector, comprising:
a light receiving element having a light receiving plane, which outputs an electric signal corresponding to the incident position and intensity of light incident on the light receiving plane; and
a scintillator unit having scintillator cells each of which produces scintillation light corresponding to the radiation absorbed thereby,
wherein K layers of scintillator arrays (K is an integer number of 2 or greater), each having the scintillator cells arrayed in M rows–N columns two-dimensional matrix (each of M and N is an integer number of 2 or greater), are laminated on the light receiving plane of said light receiving element,
wherein each of the scintillator cells is separated from the adjacent scintillator cells by partition mediums,
wherein at least one of side faces of a scintillator cell $C_{k1,m,n}$ included in a scintillator array of the k1-th layer is faced with the partition medium which has different optical characteristic from that of the partition medium facing the corresponding side face of a scintillator cell $C_{k2,m,n}$ included in a scintillator array of the k2-th layer, said corresponding side face being located at the same two-dimensional position as said one of side faces in a plane parallel to the light receiving plane, provided that $C_{k,m,n}$ is defined as a scintillator cell located at m-th row and a n-th column within a scintillator array of the k-th layer (1<k<K, 1<m<M, 1<n<N), and wherein in every layer at least one partition medium has different optical characteristic from those of the others.

14. A radiation three-dimensional position detector, comprising:
a light receiving element having a light receiving plane, which outputs an electric signal corresponding to the incident position and intensity of light incident on the light receiving plane; and
a scintillator unit having scintillator cells each of which produces scintillation light corresponding to the radiation absorbed thereby,
wherein K layers of scintillator arrays (K is an integer number of 2 or greater), each having the scintillator cells arrayed in M rows–N columns two-dimensional matrix (each of M and N is an integer number of 2 or greater), are laminated on the light receiving plane of said light receiving element, and
wherein at least one of side faces of a scintillator cell $C_{k1,m,n}$ included in a scintillator array of the k1-th layer has different optical characteristic from that of the corresponding side face of a scintillator cell $C_{k1,m,n}$ included in a scintillator array of the k2-th layer, said corresponding side face being located at the same two-dimensional position as said one of side faces in a plane parallel to the light receiving plane, provided that $C_{k,m,n}$ is defined as a scintillator cell located at m-th row and a n-th column within a scintillator array of the k-th layer (1<k<K, 1<m<M, 1<n<N)(3<M, 3<N for each layer), wherein a reflective material is disposed between a pair of the side faces of adjoining scintillator cells, and
wherein among all the side faces at the same two-dimensional position in the plane parallel to the light receiving plane, there is at least one that is not faced with the reflective material, for every two-dimensional position in the plane parallel to the light receiving plane.

15. The radiation three-dimensional position detector according to claim 14, wherein not more than one scintillator cell satisfies the condition that only a pair of opposing side faces are faced with the reflective material at the same two-dimensional position in the plane parallel to the light receiving plane.

16. A radiation three-dimensional position detector, comprising:
a light receiving element having a light receiving plane, which outputs an electric signal corresponding to the incident position and intensity of light incident on the light receiving plane; and
a scintillator unit having scintillator cells each of which produces scintillation light corresponding to the radiation absorbed thereby,
wherein K layers of scintillator arrays (K is an integer number of 2 or greater), each having the scintillator cells arrayed in M rows–N columns two-dimensional matrix (each of M and N is an integer number of 2 or greater), are laminated on the light receiving plane of said light receiving element,
wherein each of the scintillator cells is separated from the adjacent scintillator cells by partition mediums, and
wherein at least one of side faces of a scintillator cell Chd k1,m,n included in a scintillator array of the k1-th layer has different optical characteristic from that of the corresponding side face of a scintillator cell $C_{k2,m,n}$ included in a scintillator array of the k2-th layer, said corresponding side face being located at the same two-dimensional position as said one of side faces in a plane parallel to the light receiving plane, provided that $C_{k,m,n}$ is defined as a scintillator cell located at m-th row and a n-th column within a scintillator array of the k-th layer (1<k<K, 1<m<M, 1<n<N), and wherein at each of two-dimensional positions in the plane parallel to the light receiving plane, at least one layer comprises the partition medium made up of a reflective material.

* * * * *